(12) United States Patent
Ward et al.

(10) Patent No.: US 7,590,563 B1
(45) Date of Patent: *Sep. 15, 2009

(54) METHOD AND APPARATUS FOR SUBSCRIPTION-BASED SHIPPING USER INTERFACE

(75) Inventors: Charles L. Ward, Sammamish, WA (US); Vijay Ravindran, Seattle, WA (US); David I. Gellman, Seattle, WA (US); Jeffrey A. Holden, Seattle, WA (US); Nanyan Nicholls, Greater Seattle, WA (US); Michael T. Sha, Greater Seattle, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 767 days.

This patent is subject to a terminal disclaimer.

(21) Appl. No.: 11/170,804

(22) Filed: Jun. 30, 2005

Related U.S. Application Data

(60) Provisional application No. 60/648,500, filed on Jan. 31, 2005.

(51) Int. Cl.
   *G06Q 30/00* (2006.01)
(52) U.S. Cl. ...................................................... 705/26
(58) Field of Classification Search .................. 705/26, 705/27
   See application file for complete search history.

(56) References Cited

U.S. PATENT DOCUMENTS

| | | | |
|---|---|---|---|
| 5,960,411 | A | 9/1999 | Hartman et al. |
| 6,615,226 | B1 | 9/2003 | Hartman et al. |
| 6,629,079 | B1 | 9/2003 | Spiegel et al. |

(Continued)

FOREIGN PATENT DOCUMENTS

| KR | 2001025523 A | * | 4/2001 |
|---|---|---|---|

OTHER PUBLICATIONS

Berkowitz, H., "Interactive TV not so Active/ With Disappointing Digital Viewership, Cablevision Slashes iO's Fees," Newsday, Nassau and Suffolk edition, Business and Technology section, p. A41, Apr. 8, 2002.*

(Continued)

*Primary Examiner*—Nicholas D Rosen
(74) *Attorney, Agent, or Firm*—Robert C. Kowert; Meyertons, Hood, Kivlin, Kowert & Goetzel, P.C.

(57) ABSTRACT

Computer-accessible medium and apparatus for providing subscription-based shipping of items. Embodiments may provide mechanisms that allow customers of an e-commerce Web site to pay a fee to obtain a subscription in a shipping program that provides subscribed customers with free and/or reduced-rate shipping for at least some items ordered via the e-commerce Web site during the period covered by the subscription. The Web site may provide user interface elements on the Web site that may provide one or more shipping and possibly other options only to subscribed customers. Some embodiments may provide mechanisms that allow a subscriber to share a subscription to the shipping program with other customers. One embodiment may provide a mechanism through which a subscribed customer can invite other customers to share a subscription. Some embodiments may provide other exclusive services and/or offers to the subscribers of the shipping program that are not provided or offered to non-subscribers.

75 Claims, 17 Drawing Sheets

U.S. PATENT DOCUMENTS

| | | | | |
|---|---|---|---|---|
| 6,641,037 | B2* | 11/2003 | Williams | 235/383 |
| 2003/0060914 | A1* | 3/2003 | Takeuchi | 700/109 |
| 2004/0093311 | A1* | 5/2004 | Chew et al. | 705/401 |
| 2005/0004878 | A1* | 1/2005 | Malone | 705/400 |
| 2006/0149807 | A1* | 7/2006 | Ding et al. | 709/203 |

OTHER PUBLICATIONS

Anon., "www.RCA.com Website Enhanced with Dealer Locator Service, Detailed Product Specs, Online Owner's Manuals and Warranty Registration, and Consumer Purchase Options," PR Newswire, Oct. 14, 1999.*

U.S. Appl. No. 11/170,941, filed Jun. 30, 2005.

U.S. Appl. No. 11/170,917, filed Jun. 20, 2005.

U.S. Appl. No. 11/370,579, filed Mar. 8, 2006.

OneCall PASS Rules and Regulations, 2004.

Overstock.com Club O Terms and Conditions, Apr. 11, 2004.

Overstock.com Club O membership screen shots, 2004.

Overstock.com Club O Gold membership screen shots, 2004.

Overstock.com Club Gold Terms and Conditions, Sep. 6, 2004.

backpackinglight.com subscription, http://www.backpackinglight.com/cgi-bin/backpackinglight/subscribe_corp.html, Copyright 2003-2006.

sassnet.com membership, http://www.sassnet.com/store/page13.html, Copyrigth 1999-2001.

Smith Brothers Farms Dairy Home Delivery, http://www.smithbrothersfarms.com.

Pioneer Organics, http://www.pioneerorganics.com.

* cited by examiner

```
┌─────────────────────────────────────────────────────────────────────┐
│                       Website navigation                            │
│                              300                                    │
├─────────────────────────────────────────────────────────────────────┤
│ ┌──────────────────────────────────────┐                            │
│ │ Primary Subscriber: Joe Customer  308│                            │
│ │ Birthday: August 20                  │         310                │
│ │ Original payment method: Visa ####   │          ↓                 │
│ │ Membership Dates: March 1, 2005 - March 2 2006                    │
│ └──────────────────────────────────────┘      ╭───────────────╮     │
│                                               │ Do Not Renew  │     │
│  Your membership will renew automatically on: March 2 2006    │     │
│                                               ╰───────────────╯     │
│                                                                     │
│ ┌─────────────────────────────────────────────────────────────────┐ │
│ │ Pending Invitations                                         312 │ │
│ │ These household members have not yet accepted your invitation:  │ │
│ │                                          314     316     318    │ │
│ │ Name          Relationship  E-Mail              Birthday        │ │
│ │ Bill Buyer    Friend        BillB@mailprovider.com  May 14      │ │
│ │                                      (Reinvite) (Edit) (Remove) │ │
│ └─────────────────────────────────────────────────────────────────┘ │
│                                                                     │
│ ┌─────────────────────────────────────────────────────────────────┐ │
│ │ Accepted Invitations                                        320 │ │
│ │                                                                 │ │
│ │ Name           Relationship  E-Mail              Birthday       │ │
│ │ Mary Customer  Spouse        MaryC@mailprovider.com  June 3     │ │
│ │                                               (Edit)  (Remove)  │ │
│ │ Jerry Customer Child         JerryC@mailprovider.com December 8 │ │
│ │                                               (Edit)  (Remove)  │ │
│ └─────────────────────────────────────────────────────────────────┘ │
└─────────────────────────────────────────────────────────────────────┘
```

*Figure 13*

Website navigation
300

Primary Subscriber: Joe Customer    308
Original payment method: Visa ####
Membership Dates: March 1, 2005 - March 2 2006

310

Your membership will renew automatically on: March 2 2006    (Do Not Renew)

Invite a household member    330
Up to four household members may share this membership.

Please enter your birthday first. When you invite a household member to share this membership, they will be asked for your birthday and their birthday to verify their identities:

Your Birthday: [month/day]

Now provide the following information for the person you wish to invite and select "Invite" when finished:
332

| Name | Relationship | E-Mail | Birthday | |
|---|---|---|---|---|
| | | | month/day | (Invite) |

*Figure 14*

Website navigation
300

Joe Customer has invited you to join the    334
subscription-based shipping program <Description of Shipping Program>

Learn more about the Shipping Program

Enter Joe Customer's Birthday: [month/day]

Enter your Birthday: [month/day]

338

(Accept Invitation)
336

*Figure 15*

```
                         Website navigation
                                300
```

Shipping to:  (Change)    370
Joe Customer
<Shipping address>

Shipping Options:    372

Choose a shipping speed:
○ Standard Shipping (3-5 business days)
◉ Two-Day Shipping (2 business days)
○ Next-Day Shipping (1 business day)

Choose a shipping preference:
○ Group my items in as few shipments as possible
◉ Ship my items as they become available

The following items will arrive in 2 shipments:    374

Item A  (Not eligible for subscription-based shipping program)

Item B  (Eligible for subscription-based shipping program)

Item C  (Eligible for subscription-based shipping program)

380
Order Summary

Payment Method:    382
<Payment method>
(Change)

Billing Address:    384
Joe Customer
<Billing address>
(Change)

(Place your order
     390)

METHOD AND APPARATUS FOR SUBSCRIPTION-BASED SHIPPING USER INTERFACE

PRIORITY INFORMATION

This application claims benefit of priority to U.S. Provisional Patent Application No. 60/648,500 filed Jan. 31, 2005 titled "Method and Apparatus for Subscription-Based Shipping" which is hereby incorporated by reference herein in its entirety.

BACKGROUND OF THE INVENTION

1. Field of the Invention

This invention relates to a computer network-based service and related user interfaces for reducing shipping charges.

2. Description of the Related Art

Manufacturers, retailers, wholesalers, distribution centers, and other distributors of product or goods (which may collectively be referred to as distributors) typically maintain an inventory of various items that may be ordered by and shipped to clients or customers. This inventory may be maintained and processed at a materials handling facility or facilities such as distribution centers, cross-docking facilities, and order fulfillment facilities. FIG. 1 illustrates a broad view of the operation of a conventional distributor. Multiple customers 10 may submit orders 20 to the distributor, where each order 20 specifies one or more items from inventory 30 to be shipped to the customer that submitted the order. At order fulfillment 40, the orders may be processed by the enterprise to fulfill the customer orders 20. The one or more items specified in each order may be retrieved or "picked" from inventory 30 in the materials handling facility. The picked orders may then be packed and shipped 50 to the customers 10. Note that a shipped order does not necessarily include all of the items ordered by the customer; a shipped order may include only a subset of the ordered items available to ship at one time from one inventory-storing location. Typically, the customer is billed for the items(s) in the order and for charges related to shipping the order to the customer.

The increasing scope of electronic commerce (e-commerce), fueled by the ubiquity of personal computers, the Internet, and the World Wide Web, has resulted in striking changes to the ways customers may shop for and purchase products from distributors. Virtual storefronts, which may be referred to as "e-commerce Web sites", in which customers may view product information including features, specifications, appearance, pricing, availability, have become commonplace even among wholesalers and retailers who have maintained physical customer presences (e.g., "brick-and-mortar" storefronts). Much commerce is already being conducted exclusively through e-commerce Web sites by product distributors lacking any other customer presence. Electronic commerce using virtual storefronts may offer many advantages, such as lower cost overhead (e.g., due to lack of sales personnel, lack of physical storefronts, highly automated ordering processes, etc.), and a potential customer base limited only by the reach of the Internet. A product distributor that provides a "storefront" for customers exclusively through an e-commerce Web site, or the portion of a product distributor that provides an e-commerce Web site for customers while the distributor maintains physical customer presences, may be referred to as an "e-commerce enterprise".

FIG. 2 illustrates an exemplary e-commerce enterprise that provides a "virtual storefront" to customers via an e-commerce Web site. Multiple customers 110, through access to the Internet 100, may order one or more items from the e-commerce enterprise 102 via an e-commerce Web site 104 (or Web sites) serving as a "virtual storefront" for the product distributor. The Web site 104 may generate orders 120 for the customers, where each order 20 specifies one or more items from inventory 130 to be shipped to the customer that submitted the order. The orders may be processed 140 by the product distributor to fulfill the customer orders 120. The one or more items specified in each order may be retrieved or "picked" from inventory 130 in a materials handling facility. The picked orders may then be packed and shipped 150 to the customers 110. Note that a shipped order does not necessarily include all of the items ordered by the customer; a shipped order may include only a subset of the ordered items available to ship at one time from one inventory-storing location. Typically, the customer is billed 106 for the items(s) in the order and for charges related to shipping the order to the customer.

SUMMARY

Various embodiments of a method and apparatus for providing subscription-based shipping of items to customers are described. Embodiments may provide mechanisms that allow customers of a Web-based electronic commerce (e-commerce) enterprise's Web site to pay a fee to obtain a subscription in a shipping program offered to customers of the e-commerce enterprise that provides the customers with free and/or reduced-rate shipping for at least some items ordered via the e-commerce enterprise's Web site during the period covered by the subscription. In embodiments, in paying for a subscription to the program, a customer may essentially be pre-paying a fixed shipping charge for the period of the subscription instead of paying a per-order shipping charge. In one embodiment, a subscriber may purchase as many items as desired at any time they desire during the duration of the subscription to take advantage of the reduced or free shipping, thus not having to reach some threshold of the number or cost of ordered items to obtain reduced or free shipping costs.

In embodiments, the e-commerce Web site may provide various shipping program user interface elements on item detail pages and/or other pages of the Web site that may display one or more shipping options and possibly other options or services available only to customers subscribed to the shipping program. In one embodiment, these shipping program user interface elements may only be displayed when the various Web pages of the e-commerce Web site are accessed by subscribed customers. One or more user interface elements for subscribing to the shipping program may be displayed to all customers of the e-commerce Web site.

Some embodiments may provide one or more "single action" user interface elements through which a customer, via a single action on a user interface presented to the customer, such as a Web page, may initiate one or more services of the subscription-based shipping program. Some embodiments may provide a user interface element via which a customer may subscribe to the shipping program via a single action, for example a single selection of a "subscribe now" button. Some embodiments may provide one or more single-action user interface elements, for example on an item detail page, via which a subscribed customer may initiate an order for an item provided by the e-commerce enterprise according to one or more shipping options provided to the subscribed customer by the shipping program, wherein each shipping option is associated with a particular one of the single-action user interface elements. In this embodiment, a single action by the subscribed customer on a user interface provided by the e-commerce enterprise's Web site to select a particular one of the shipping options provided by the shipping program automatically initiates the purchase order, processing, and shipping of an item offered by the e-commerce enterprise's Web site according to the selected shipping option.

The subscribed customers (or subscribers) may be pre-existing customers with accounts for accessing the e-commerce enterprise's Web site or new customers creating new accounts for accessing the e-commerce Web site. Items ordered under the shipping program may be shipped to the subscriber's shipping address or, alternatively, to a third-party address specified or selected by the subscriber. In one embodiment, the subscriber may elect to have membership automatically renewed at the end of the subscription period, or alternatively a membership may be automatically renewed unless cancelled by the primary subscriber (the customer that originally obtains the subscription). In some embodiments, certain items offered by the e-commerce enterprise may not be eligible for the shipping program.

Some embodiments may also provide one or more mechanisms via the e-commerce Web site that allow a subscriber to share a subscription to the shipping program with one or more other customers. These embodiments may provide a mechanism by which a primary subscriber may share the subscription with one or more other customers, such as residents of the primary subscriber's household. In one embodiment, a mechanism may be provided for a primary subscriber to invite one or more other customers (e.g., members of the primary subscriber's household) to share the subscription. The invited customers may then accept, reject, or just ignore the invitation. In one embodiment, there may be an upper limit on the number of customers that a membership may be shared with.

An exemplary subscription-based shipping program may allow any customer of the e-commerce enterprise to pay an annual membership fee to receive benefits including, but not limited to: free 2-day shipping on ordered items, or free standard shipping if 2-day shipping is not available for an item; next-day shipping on ordered items at a reduced cost per item; shipping either to the subscriber's address or to third-party addresses; the ability to share the membership at no additional charge with one or more other customers, such as residents of the primary subscriber's household.

Note that the above is an exemplary subscription-based shipping program and is not intended to be limiting; other implementations may be set up differently. For example, other implementations may provide only one discounted or free shipping method for subscribers to the program (e.g., free 2-day shipping), or more than two discounted and/or free shipping options for subscribers the program. As another example, implementations may issue subscriptions to the program for different periods or using other models; for example, implementations may offer one or more of monthly subscriptions, bi-annual subscriptions, annual subscriptions, and lifetime memberships, or combinations thereof. Also note that some implementations may offer tiered subscriptions that may provide customers the option select from two or more levels of the shipping program, possibly for different subscription fees, which may be offered for different periods and/or that provide different levels of shipping discounts or other services.

Some embodiments may offer benefits, special offers, and/or exclusive services to the subscribers of the shipping program that are not offered to non-subscribers; for example exclusive and/or first access to special items or special offers, and/or special "fast track" handling of the subscribed customer's orders.

BRIEF DESCRIPTION OF THE DRAWINGS

FIG. 13 illustrates an exemplary Web page via which a primary subscriber may view and edit information about the subscription, including information on invited customers and customers that have accepted previous invitations, according to one embodiment.

FIG. 14 illustrates an exemplary Web page via which a primary subscriber may invite other customers to share the subscription to the shipping program according to one embodiment.

FIG. 15 illustrates an exemplary Web page via which an invited customer may accept an invitation to share a subscription according to one embodiment.

FIG. 18 illustrates an exemplary Web page via which a primary or secondary subscriber may view information about items that have been added to a cart or collection of items that the customer may order, if desired, according to one embodiment.

Figure 1:
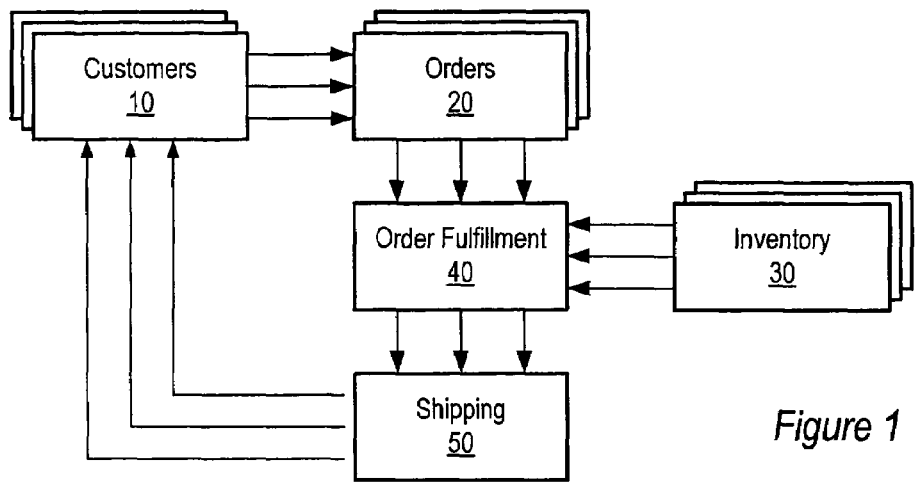
FIG. 1 illustrates a broad view of the operation of a conventional distributor.
Figure 2:
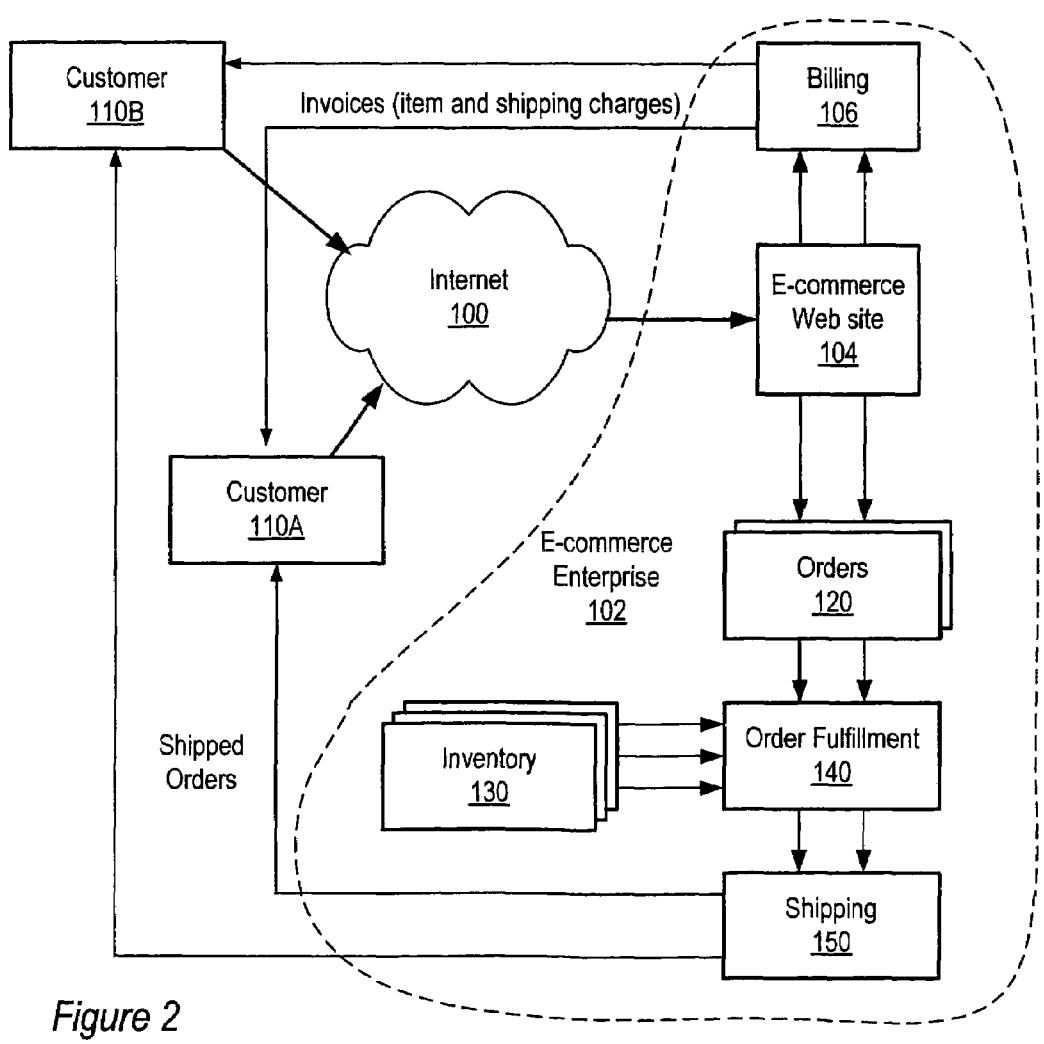
FIG. 2 illustrates an exemplary e-commerce enterprise that provides a "virtual storefront" to customers via an e-commerce Web site.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for providing subscription-based shipping of items to customers are described. Embodiments may provide mechanisms that allow customers of Web-based electronic commerce (e-commerce) enterprises to pay a fee to obtain a subscription or membership in a shipping program offered to customers of the e-commerce enterprise for a period (e.g., a month, six months, a year, etc) that provides the customers with free and/or reduced-rate shipping for at least some items ordered from the enterprise (for example, ordered from a Web site of the enterprise) during the period covered by the subscription. In embodiments, in paying for a subscription to the program, a customer may essentially be pre-paying a fixed shipping charge for a period (a month, six months, a year, etc.) instead of paying a per-order shipping charge based upon the number of items ordered, the size and/or weight of the items, or other factors. Instead of customers paying per-unit charges for every order for shipping, embodiments provide a subscription-based shipping program with a fixed subscription, and thus shipping, cost for the subscriber. In one embodiment, subscribers to the program may be allowed to order as many eligible items as they want during the duration of the subscription while paying a fixed charge (the subscription fee) for shipping that covers the duration of the subscription.

In embodiments, the e-commerce Web site may provide various shipping program user interface elements on item detail pages and other pages of the Web site that may display one or more shipping options and possibly other options or services available only to customers subscribed to the shipping program. In one embodiment, these shipping program user interface elements may only be displayed when the various Web pages of the e-commerce Web site are accessed by subscribed customers. One or more user interface elements for subscribing to the shipping program may be displayed to all customers of the e-commerce Web site.

Some embodiments may provide one or more "single action" user interface elements through which a customer, via a single action on a user interface presented to the customer, such as a Web page, may initiate one or more services of the subscription-based shipping program. Some embodiments may provide a user interface element via which a customer may subscribe to the shipping program via a single action, for example a single selection of a "subscribe now" button. In these embodiments, the customer may be subscribed to the program using customer information, including, but not limited to, shipping address, billing address, and payment method information, that the customer has previously provided, for example in the process of setting up a user account with the e-commerce enterprise's Web site.

Some embodiments may provide one or more single-action user interface elements, for example on an item detail page, via which a subscribed customer may initiate an order for an item provided by the e-commerce enterprise according to one or more shipping options provided to the subscribed customer by the shipping program, wherein each shipping option is associated with a particular one of the single-action user interface elements. Note that, in one embodiment, these single-action shipping options may only be presented to subscribed customers, and not to non-subscribed customers. In this embodiment, a single action by the subscribed customer on a user interface provided by the e-commerce enterprise's Web site to select a particular one of the shipping options provided by the shipping program automatically initiates the purchase order, processing, and shipping of an item offered by the e-commerce enterprise's Web site according to the selected shipping option. In this embodiment, customer information associated with the subscription including, but not limited to, shipping address, billing address, and payment method information may be used in the automatic processing of the order in response to the single action selection of the shipping option.

Note that, in some embodiments, one or more other single-action items to initiate other services provided by the e-commerce Web site may be presented to subscribed customers and/or to non-subscribed customers of the Web site. For example, in one embodiment, all customers that have an account with the Web site, whether subscribed or not subscribed to the shipping program, may be presented with a single-action user interface element for initiating a purchase order on the item detail pages of qualified items offered for sale by the Web site.

A method and system for the single-action initiation of a purchase order is described in U.S. Pat. No. 5,960,411, titled "Method and System for Placing a Purchase Order via a Communications Network", issued Sep. 28, 1999, which is hereby incorporated by reference.

The subscribed customers (or subscribers) may be pre-existing customers with accounts for accessing the e-commerce enterprise's Web site or new customers creating new accounts for accessing the Web site. Items ordered under the shipping program may be shipped to the subscriber's shipping address or, alternatively, to a third-party address specified or selected by the subscriber. Note that, in some embodiments, certain items (for example, heavy and/or large items) may not be eligible for the shipping program, for example because it may not be cost-effective for the enterprise to ship the excluded items under the shipping program.

In one embodiment, the subscriber may elect to have membership automatically renewed at the end of the subscription period, or alternatively the membership may be automatically renewed unless cancelled by the primary subscriber (the customer that originally obtains the subscription is the primary subscriber; other customers with which the subscription is shared may be referred to as secondary subscribers).

Some embodiments may provide one or more mechanisms via the e-commerce Web site that allow a subscriber to share membership in the program with one or more other customers. These embodiments may provide a mechanism by which a primary subscriber may share the membership in the program, at no additional charge or, alternatively, for an additional fee, with one or more other customers, such as residents of the primary subscriber's household. In one embodiment, there may be an upper limit on the number of customers that a membership may be shared with. In one embodiment, a mechanism may be provided for a primary subscriber to invite one or more other customers (e.g., members of the primary subscriber's household) to share the membership. A mechanism may be provided through which the invited customers may then accept the invitation to become secondary subscribers, reject, or just ignore the invitation. Alternatively, the primary subscriber may be allowed to directly add one or more customers to the subscription without issuing invitations to the customers.

Some embodiments may include a mechanism or mechanisms for authenticating invited customers and/or verifying that invited customers are from the same household (or, alternatively, from some other entity) as the primary subscriber. As an example, the primary subscriber, when inviting another customer to share a subscription, may be asked to provide the primary subscriber's birth date and the birth date of the invited customer. The invited customer may then be asked to provide the birth dates to authenticate/verify the invited customer. Alternatively, other personal information or combinations of personal information may be used to authenticate invited customers and/or to verify that the invited customers are from the same household as the primary subscriber. In one embodiment, an identity service may be used to authenticate and/or verify invited customers.

Embodiments may allow an e-commerce enterprise to increase its database of customer personal information, such as birthday information, by collecting personal information to authenticate/verify invited customers, which may provide the enterprise with more opportunities for merchandising directed at the personal needs of the customer or tailored to the personal information of the customer, for example merchandising related to the birthday of the customer. In addition, the ability to share the subscription with other customers may generate new customers for the e-commerce enterprise that might not otherwise access the e-commerce enterprise's Web site to order items.

Note that a customer may subscribe to the subscription-based shipping program independently of any other given order for items, products or goods from the e-commerce enterprise. Subscription to the shipping program may be: a different, independent transaction than an order for an item or items, that may occur at any time and that may be separately paid for, and that may then be applied to any customer selection or combinations of selections of items from all or a portion of the items offered in the enterprise's catalog of items. Items that the subscribed customer may or does order under the shipping program are not selected for the customer by the enterprise, though in some implementations certain items may not be eligible for the shipping program.

In one embodiment, both subscribed and non-subscribed customers, when they are presented with an offer for an item by the e-commerce enterprise, for example on an item detail page of the e-commerce enterprise's Web site, may see the exact same item at the exact same sales price. The difference is in how payments for the items are structured; the items are not offered at different prices to subscribed and non-subscribed customers. Instead, subscribed customers may be offered, and billed at, different, lower shipping rates, according to the shipping options offered by the shipping program, for similar shipping methods for the same priced items than are non-subscribed customers. In other words, shipping charges are not built into the price of the items. Embodiments provide the ability for subscribed customers to order and pay for as many items as they like for the same price as non-subscribed customers would pay, while obtaining reduced or free shipping for the items.

While embodiments are generally described as providing subscribed customers with the same items for the same prices as are provided to non-subscribed customers, while providing the subscribed customers shipping options that provide free and/or reduced-rate shipping for the items, note that some embodiments of a subscription-based program may alternatively provide the same shipping for the items, but reduced prices for the items, to the subscribed customers.

Conventional shipping programs are typically threshold-based; the customer may be required to order a certain number or cost of items to obtain the benefit of reduced or free shipping. Through embodiments of the subscription-based shipping program as described herein, a subscriber may buy as many items as desired at any time they desire during the duration of the subscription to take advantage of the reduced or free shipping, thus not having to reach some threshold of the number or cost of ordered items to obtain reduced or free shipping costs. This may help reduce or eliminate the concern of shipping costs out of the subscriber's purchasing decision.

Embodiments may allow e-commerce enterprises to expand their base of convenience-oriented (as opposed to value-oriented) customers. Embodiments may help to reduce or eliminate shipping cost as a factor in the buy from a "brick-and-mortar" storefront vs. buy online ordering decision of customers. A subscribed customer may be motivated to order some items from the e-commerce enterprise's Web site rather than purchase them from a store that the customer would perhaps otherwise buy from if shipping charges were attached to ordering the item online. Embodiments may reward customers who purchase often by lowering their shipping cost per order/item. Embodiments may provide an incentive for subscribed customers to purchase more items once they reach the break-even threshold for shipping costs because the customers essentially get free shipping from then on.

The subscription-based shipping program may make it relatively simple and straightforward for the customer to understand shipping charges when compared to other shipping programs, and may simplify order processing and billing in the e-commerce enterprise systems that implement the program. Embodiments may provide a predictable and easy-to-model shipping revenue stream for product distributors. Note that, "distributor", as used herein, may apply to any entity that distributes products or goods to customers. A distributor may be a manufacturer, a wholesaler, a retailer, a distribution center, or in general any entity that distributes products, goods or items to customers. In embodiments where orders are shipped periodically to the subscribed customer or two or more customers that share a subscription, for example once per week or once every two weeks, the product distributor may be able to consolidate multiple orders for a subscribed customer or customers into a single shipment. By allowing the product distributor to bundle and ship multiple orders for one or more customers together to one shipping address, consolidation may help the distributor to simplify and optimize the order fulfillment process and reduce its own shipping costs. Note that, since a subscription may be shared by multiple customers that share one shipping address, consolidation may be further enhanced.

Embodiments may generate more orders being shipped according to a particular shipping option, for example second-day shipping if second-day shipping is provided free to subscribers. A higher volume or orders being shipped using a particular shipping option may provide leverage with shipping vendors to the product distributor, which may allow the distributor to obtain lower shipping rates or special arrangements with a shipping vendor or vendors that give competitive advantage to the product distributor.

An exemplary subscription-based shipping program may allow any customer of the enterprise to pay an annual membership fee to receive benefits including, but not limited to: free 2-day shipping on ordered items, or free standard shipping if 2-day shipping is not available for an item; next-day shipping on ordered items at a reduced cost per item; shipping either to the subscriber's address or to third-party addresses; and the ability to share the membership at no additional charge with one or more other customers, such as residents of the same household (there may be an upper limit on the number or relationships of other customers that the membership may be shared with).

Note that the above is an exemplary subscription-based shipping program and is not intended to be limiting; other implementations may be set up differently. For example, other implementations may provide only one discounted or free shipping method for subscribers to the program (e.g., free 2-day shipping), or more than two discounted and/or free shipping options for subscribers the program. As another example, implementations may issue subscriptions to the program for different periods or using other models; for example, implementations may offer one or more of monthly subscriptions, bi-annual subscriptions, annual subscriptions, and lifetime memberships. Some implementations may offer various combinations, such as monthly subscription for the first year, and then annual subscription thereafter. Some implementations may offer tiered subscriptions, wherein customers may opt to subscribe for different periods for different fees; for example, an enterprise may offer one month, six month, annual, and lifetime memberships or subscriptions to the shipping program for different subscription fees. In general, various implementations may offer subscriptions or memberships in the program of any arbitrary duration and not strictly of regular durations. Also note that embodiments may offer other benefits to the subscriber(s), for example exclusive and/or first access to special items or special offers, and/or special "fast track" handling of the subscribed customer's orders.

While embodiments of the method and apparatus for providing a subscription-based shipping program are described herein in reference to the Web sites of e-commerce enterprises and for the subscription-based shipping of items ordered through the Web sites of e-commerce enterprises, note that embodiments may be implemented using other mechanisms than those described herein, and/or in other types of product distribution enterprises, to provide subscription-based shipping programs. For example, a catalog-based product distributor that accepts orders via mail may provide a Web site or other interface through which customers may subscribe to a shipping program that provides reduced-rate or free shipping of items ordered from the catalog(s) via mail and/or e-mail. As another example, a Web-based product distributor (e.g., an e-commerce enterprise) may solicit and accept membership in a subscription-based shipping program via mail, or via e-mail, rather than (or in addition to) soliciting and accepting membership in the subscription-based shipping program via the enterprise's Web site. In general, embodiments of a subscription-based shipping program as described herein may be implemented by distributors, manufacturers, wholesalers, or in any relationship where there is the transportation or transferal of goods or products between two parties or entities. Also note that, while embodiments are described in reference to subscription-based shipping programs, the method and apparatus as described herein may be applied to other types of subscription programs than shipping programs.

Note that, while the term "order" is generally used herein in terms of a customer purchasing an item from an e-commerce enterprise, an "order" as used herein may also refer to a rental, a lease, an exchange, or any other transaction that might occasion a shipment of one or more items to or on behalf of subscribed customers to the shipping program.

Embodiments are generally described as soliciting and accepting subscriptions to a shipping program via a user interface provided by an E-commerce enterprise's Web site. Note that, in some embodiments, subscriptions to a shipping program may be solicited by and accepted from other sources, such as other Web sites or other enterprises. In one embodiment, subscriptions to the shipping program may be received from other sources by the e-commerce enterprise's Web site via a Web services interface to the Web site. Generally speaking, a Web services interface may be configured to provide a standard, cross-platform API for communication between a client requesting some service to be performed and the service provider. In some embodiments, a Web services interface may be configured to support the exchange of documents including information describing the service request and response to that request. Such documents may be exchanged using standardized web protocols, such as the Hypertext Transfer Protocol (HTTP), for example, and may be formatted in a platform-independent data format, such as eXtensible Markup Language (XML), for example.

As an example, a financial or other institution that issues credit cards may offer a free subscription to the shipping program offered by an e-commerce enterprise as an incentive for customers to sign up for a particular credit card. When a customer signs up for the credit card, a request to sign the customer up to the subscription-based shipping program, including customer information necessary to subscribe the customer, may be forwarded to the e-commerce enterprise, for example using the Web services interface of the e-commerce enterprise's Web site. In this example, the institution that issued the credit card to the customer may pay for the subscription to the shipping program, and the credit card for which the customer signed up may be used as the default payment method for orders made by the customer under the shipping program through access of the e-commerce enterprise's Web site.

In one embodiment, the subscription-based shipping program may be integrated with a "signature" credit card that may be issued by the e-commerce enterprise to qualified customers that apply for the signature credit card. In one embodiment, a free or, alternatively, discounted subscription to the shipping program may be provided to customers that are issued the signature credit card. In one embodiment, for customers that obtain a signature credit card and that are provided with a subscription to the shipping program with the credit card, the signature credit card may be automatically used as the default payment method for items ordered under the shipping program. In one embodiment, when a customer uses the signature credit card as the default payment method for items ordered under the shipping program, the customer may be given, additional discounts for shipping methods offered under the shipping program, and/or given access to services and offers provided only to signature card holders that are subscribers to the shipping program. Alternatively, or in addition, customers already subscribed to the shipping program may acquire the signature credit card and use it as the default payment method for items ordered under the shipping program to obtain discounted shipping costs and/or other special services and offers under the shipping program, and/ or customers that already have a signature credit card but that are not subscribed to the shipping program may be given the opportunity to subscribe to the shipping program, possibly at reduced or no cost, to obtain discounted prices and/or special services. Integrating the signature credit card with the shipping program, in particular offering a free or discounted subscription to the shipping program with the card and offering special pricing and/or services for the use of the signature card as the default payment method, may encourage customers to acquire and use the signature credit card.

In one embodiment where the subscription-based shipping program is integrated with a "signature" credit card, the subscribed customer may select an item and a shipping option under the program using a single-action ordering mechanism, for example selecting a single-action user interface element on a Web page provided by the e-commerce Web site. The single-action user interface element may indicate the particular shipping option available under the shipping program, and may be one of two or more single-action user interface elements, each indicating a particular shipping option, displayed to the subscribed customer. In this embodiment, a single input by the subscribed customer may specify a particular item and a particular shipping option for the item under the shipping program. In response to the single input (e.g., selection of a single-action user interface element), an order for the specified item may be programmatically generated according to the specified shipping option, and the order charged to the signature credit card of the customer.

In one embodiment, a subscription to the shipping program may only be valid as long as the customer keeps the signature credit card. In this embodiment, if the customer cancels the signature credit card, the subscription to the shipping program may also be cancelled. As long as the customer keeps the signature credit card and uses it as the default payment method, then the customer keeps the subscription to the shipping program. This may act as an incentive for customers to keep and use the signature credit card.

Figure 3:
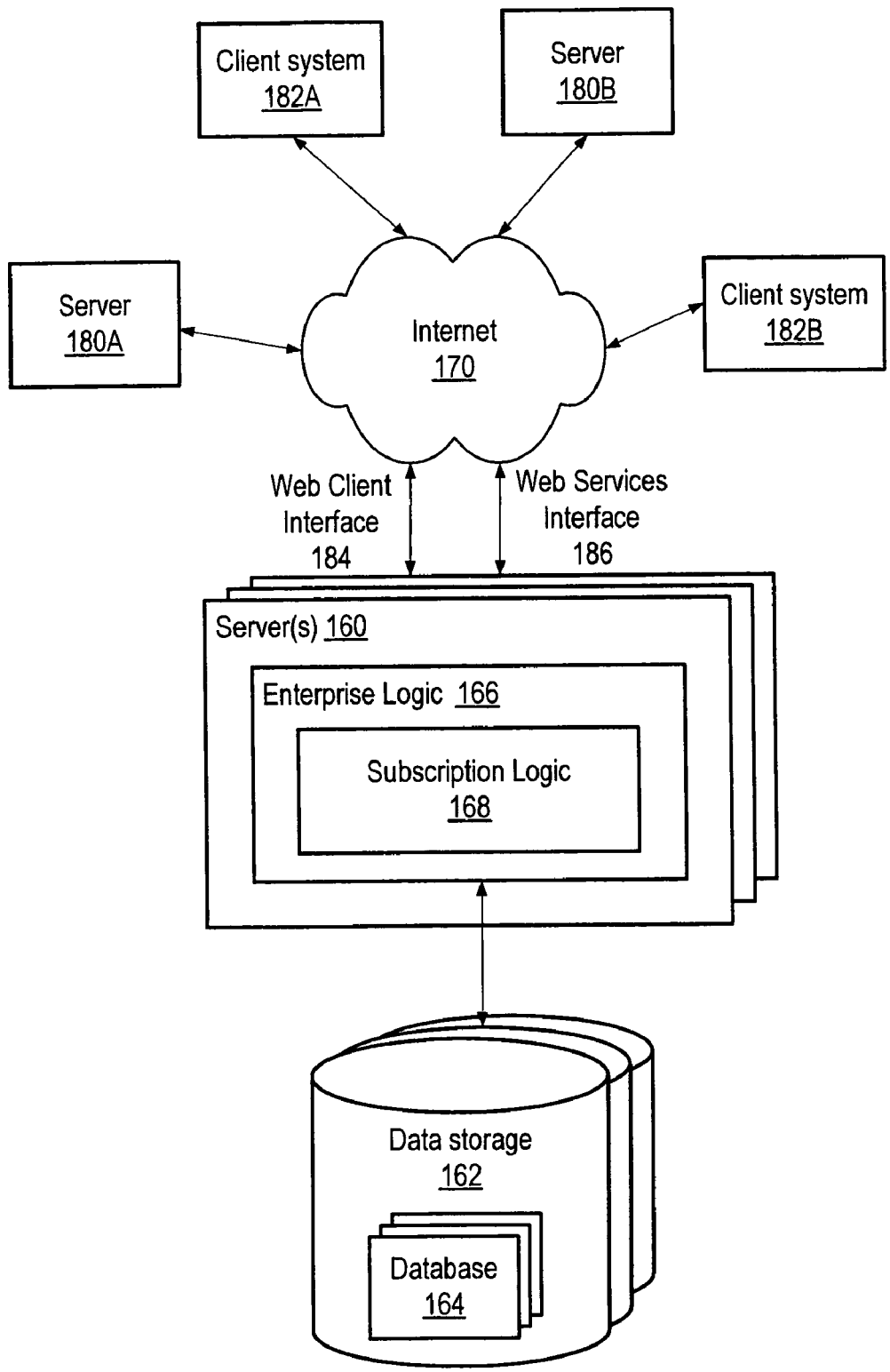
FIG. 3 is a block diagram that illustrates an exemplary system configuration for implementing an embodiment of a subscription-based shipping program as described herein.
Figure 22:
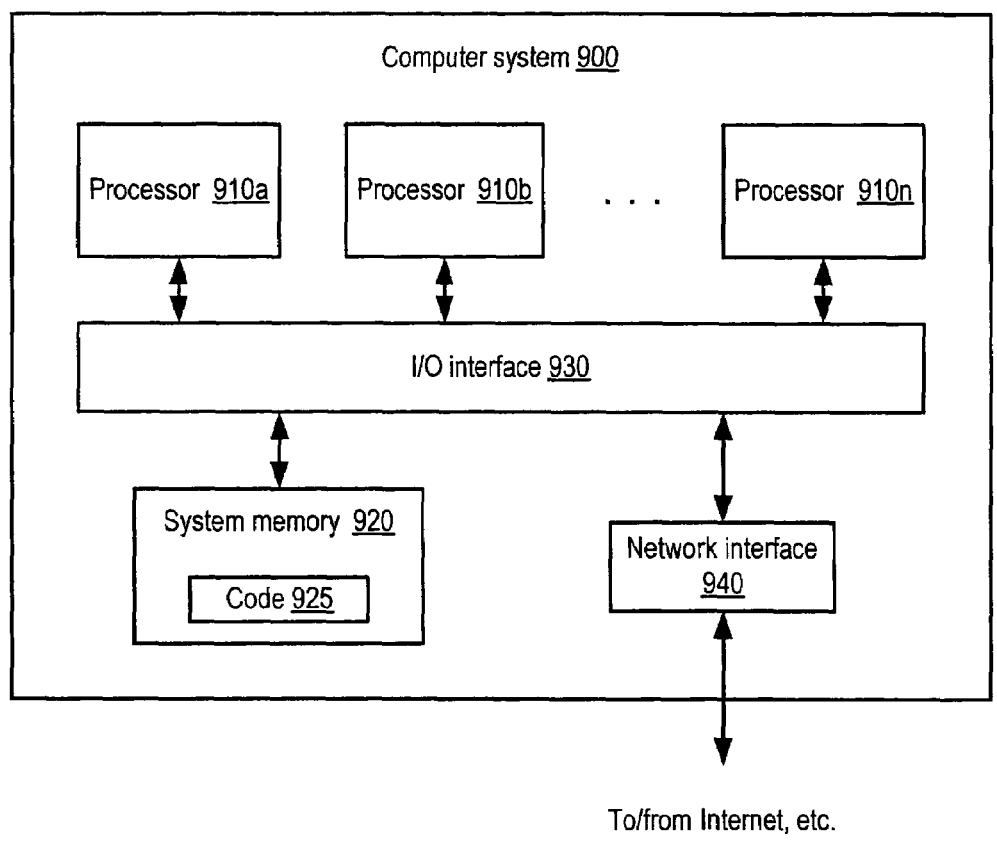
FIG. 22 is a block diagram illustrating an exemplary embodiment of a computer system.

FIG. 3 is a block diagram that illustrates an exemplary system configuration for implementing an embodiment of a subscription-based shipping program at an e-commerce enterprise's Web site as described herein. An e-commerce enterprise's Web site may be implemented on one or more servers 160, one or more of which may be coupled to Internet 170. An exemplary system architecture that may be used for a server 160 is illustrated in FIG. 22. Servers 160 may include software and/or hardware that implements enterprise logic 166 through which the functionalities of the e-commerce enterprise may be supported, and through which items offered by the e-commerce Web site may be ordered according to embodiments of the subscription-based shipping program as described herein, or via other ordering methods. Enterprise logic 166 may include software and/or hardware that implements subscription logic 168 that provides the functionalities of the subscription-based shipping program as described herein.

Servers 160 may be coupled to data storage 162 for storing information in database 164 related to the Web site including, but not limited to, Web pages, data related to items offered by the Web site, and customer information. Data storage 162 may be implemented as one or more storage devices configured independently or as a storage system. In general, data storage 162 may be implemented as one or more of any type of storage device and/or storage system suitable for storing data used by the server systems of the Web site including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Database 164 may be implemented as a single, monolithic database or as a combination of two or more databases and/or data stored in other, non-database formats, such as files stored in any of various file formats. Database 164 may be or may include a relational database, or may be or may include any other type of database, such as an object oriented database, depending on implementation, or combinations thereof. In one embodiment, database 164 may include a customer database configured for storing information about customers that have accounts for accessing the e-commerce Web site. In one embodiment, database 164 may include a subscription database for storing information about customers that have subscribed to the shipping program and that have accepted invitations to share a subscription obtained by another customer. In one embodiment, database 164 may include an invitation database for storing information about customers that have been invited to share another customer's subscription to the shipping program One or more client systems 182 may be coupled to Internet 170. Each client system 182 may be configured to access the e-commerce enterprise's Web site using a Web client application, such as a Web browser, via Web client interface 184. One or more other servers 180 may be coupled to Internet 170, such as servers that implement the Web sites of other enterprises, institutions, individuals, etc., or even other Web sites of the e-commerce enterprise. One or more of servers 180 may be configured to access enterprise logic 166 of servers 160 via a Web services interface 186 provided by one or more of servers 180.

In one embodiment, a customer, using a client system 182 such as client system 182A, may access the e-commerce enterprise's Web site implemented by enterprise logic 166 on servers 160, for example using a Web browser. The Web site may cause to display a Web page of the Web site on client system 182A that may include one or more user interface elements for subscribing to the shipping program. Information about the shipping program and/or one or more user interface elements for accessing information about the program may also be provided. If the customer is not already subscribed to the shipping program, the customer may interact with the user interface element(s) to subscribe to the shipping program, if desired. In one embodiment, subscription to the shipping program may be accomplished via a single action by the customer, such as clicking on a "subscribe now" or other type of user interface element. In one embodiment, the customer may be subscribed to the program using customer information, including, but not limited to, shipping address, billing address, and payment method information, that the customer has previously provided, for example in the process of setting up a user account with the e-commerce enterprise's Web site.

Other mechanisms for subscribing customers to the shipping program may be provided in some embodiments. For example, in one embodiment, a customer may subscribe to the shipping program via a different Web site implemented on one of servers 180, which may then inform enterprise logic 166 of servers 160 of the subscription, for example via Web services interface 186. As another example, some other enterprise may offer free or discounted subscriptions to the shipping program as an incentive to customers for signing up to some other program or service offered by the other enterprise, such as a credit card. The other enterprise may inform enterprise logic 166 of subscriptions issued to its customers, for example via Web services interface 186. As yet another example, the e-commerce enterprise may automatically subscribe certain customers that qualify under one or more criteria to the shipping program, for example customers that spend over a certain amount purchasing items from the e-commerce enterprise's Web site over a period. In some embodiments, a customer may apply for a subscription via mail, e-mail, telephone, or some other method of communication. In these embodiments, subscription applications communicated to the e-commerce enterprise may be manually and/or automatically provided to enterprise logic 166 of servers 160. Note that, in one embodiment, customers may be required to already have, or to set up if they do not already have, a user account on the e-commerce Web site to receive and/or to use a subscription to the shipping program.

Upon receiving a subscription request submitted using any of the above methods, the subscription request may be processed by enterprise logic 166 of servers 160. In one embodiment, enterprise logic 166 may examine the subscription request to determine if the customer is qualified for the shipping program. For example, if the customer does not have a user account with the e-commerce Web site (determined by accessing database 164), the customer may be required to set up a user account before the subscription will be approved. Alternatively, a user account for the customer may be automatically created if the customer does not have one. As another example, a payment method for the subscription provided by the customer, for example a credit card number, may be checked to see if the submitted payment method is valid. If, for example, the customer submits a credit card number for a card that has expired or is overdrawn, the subscription request may be denied or, alternatively, the customer may be asked to submit an alternative payment method. Other embodiments may examine other customer information when validating a subscription request. For example, in one embodiment, customers may be permitted to have, or to share in, only one subscription to the shipping program. In this embodiment, if subscription information in database 164 is checked and it is determined that the applying customer is already listed as being a subscriber to the shipping program, then the subscription request may be denied.

Once a subscription request has been processed and approved, enterprise logic 166 of servers 160 may add the customer as a subscriber in a subscriber database in database 164. During accesses by customers of the e-commerce Web site, the subscriber database may be checked to see if the customer is a subscriber to the shipping program and, if so, then the e-commerce Web site may perform actions specific to subscribed customers, such as displaying shipping program-specific user interface elements, for example single-action interface elements for selecting shipping options available to subscribers of the shipping program, on item detail pages and/or other Web pages of the Web site. In one embodiment, a customer may have to be logged on to the customer's user account for which the subscription was issued for the customer to be detected as a subscriber to the shipping program. Another example of such action based on subscriber information in the subscriber database is to not display user interface elements for subscribing to the shipping program on Web pages accessed by customers that are already subscribed.

In one embodiment, a subscribed customer may invite other customers to share the subscription to the shipping program. In one embodiment, the Web site may provide one or more user interface elements on one or more Web pages to subscribed customers that allow the subscribed customer to submit invitations to other customers. In one embodiment, a Web page may be provided on which the subscribed customer may enter information about another customer to be invited (which may include one or more of, but is not limited to, the other customer's name, e-mail address, and relationship to the subscribed customer), and a user interface element for submitting the invitation. In one embodiment, the subscribed customer may also be asked to provide information for authenticating the invited customer, for example the birth date of the subscribed customer (if not already available in database 164) and the birth date of the invited customer. Other embodiments may provide other mechanisms for submitting an invitation to share a subscription, for example via e-mail. In one embodiment, subscriptions may only be shared with certain other qualified customers, for example other members of the subscriber's household.

In one embodiment, when a subscribed customer submits an invitation to another customer, the other customer may be added to an "invitations" database in database 164 that is configured to store information on customers that have been invited to share subscriptions to the shipping program. A notification or notifications of the invitation to share the subscription may be provided to the other customer. For example, an e-mail message informing the other customer of the invitation may be sent. As another example, the customer may be notified of the invitation the next time the customer signs on to the customer's user account on the Web site. Other methods of notifying customers that they have been invited to share as subscription to the shipping program may be used, for example via mail or telephone.

In one embodiment, the notification of the invitation sent to the other customer may include a link to a Web page on which the invited customer may accept (or reject) the invitation, and/or information on how to accept the invitation, for example by responding to an e-mail message or responding to a mailed notification. In one embodiment, the invited customer may be asked to provide information to authenticate the customer, for example the invited customer's birth date and the birth date of the subscribed customer that invited the customer to share the subscription. Once an invited customer has accepted an invitation to share a subscription, the invited customer may be added to the subscription database in database 164.

Figure 4:
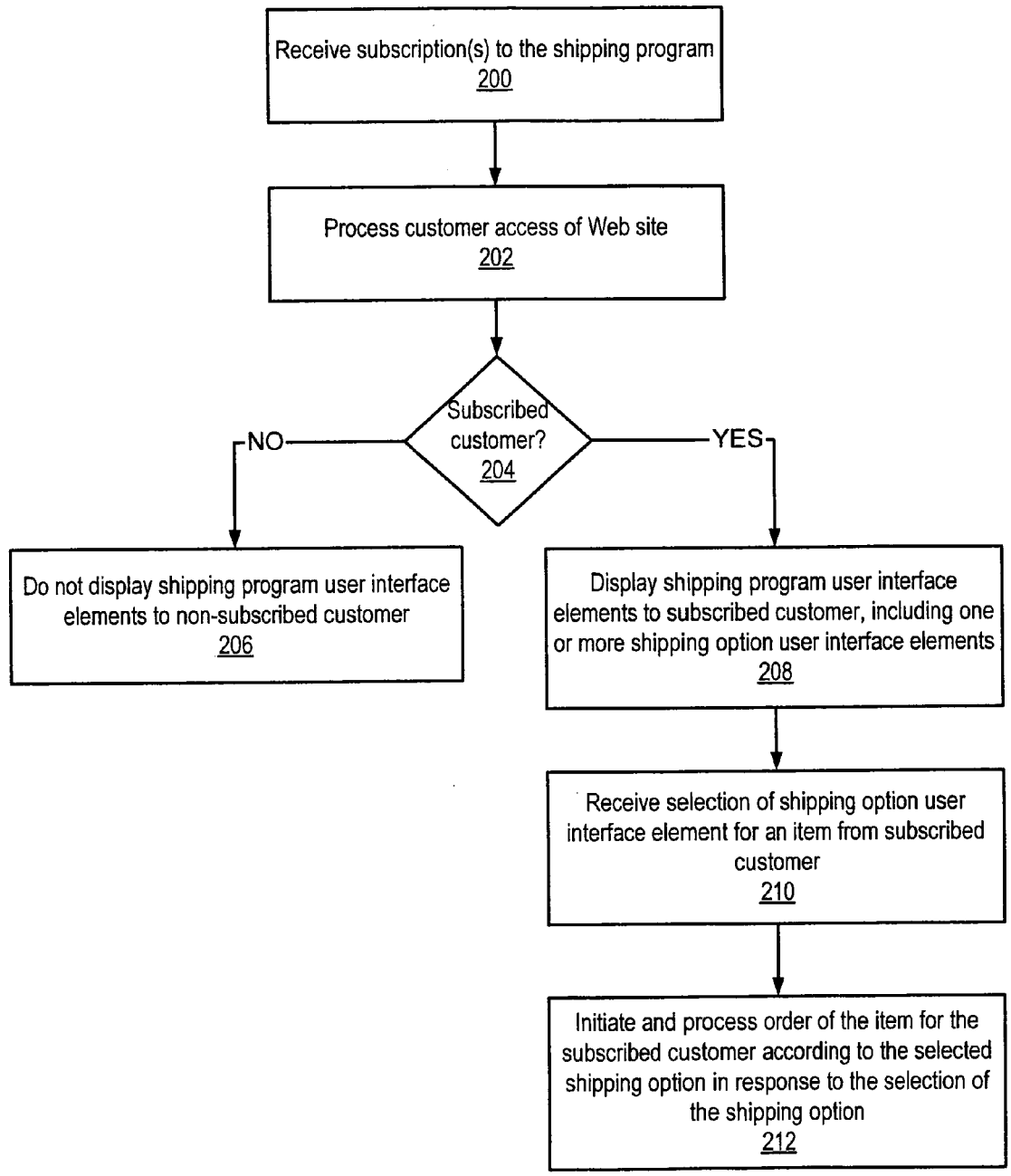
FIG. 4 is a flowchart illustrating a method of providing a subscription-based shipping program to customers according to one embodiment.

FIG. 4 is a flowchart illustrating a method of providing a subscription-based shipping program to customers of an e-commerce Web site according to one embodiment. As indicated at 200, an e-commerce Web site may receive subscription(s) to the shipping program from customers. These subscriptions may be received from customers accessing the Web site via a Web client interface as described in FIG. 3, from other servers on the Internet via a Web services interface as described in FIG. 3, or from some other source. If a subscription is accepted, the associated customer may be added to a subscription database of the Web site.

Accesses of the Web site by customers may be processed, as indicated at 202, to determine if the customers are subscribers to the shipping program. In one embodiment, when a customer accesses a Web page of the Web site, software on the server(s) may check to see if the customer is a subscriber by accessing the subscriber database. At 204, if it is determined that the customer is not a subscribed customer, then the Web site may not display at least some user interface elements specific to the shipping program on Web pages accessed by the non-subscribed customer, as indicated at 206. Note that some user interface elements related to the shipping program, such as user interface elements for subscribing to the shipping program, may be displayed on one or more Web pages to non-subscribed customers. At 204, if it is determined that the customer is a subscribed customer, then the Web site may display user interface elements specific to the shipping program and not displayed to non-subscribed customers on one or more Web pages accessed by the subscribed customer, such as one or more shipping option user interface elements on, for example, item detail pages accessed by the subscribed customer. In one embodiment, these shipping option user interface elements may be single-action user interface elements through which an associated item may be ordered according to the selected shipping option through a single action from the user (selecting a particular shipping option user interface element). In one embodiment, the Web site may not display one or more user interface elements related to the shipping program on Web pages accessed by a subscribed customer, such as user interface elements for subscribing to the shipping program.

As indicated at 210, the Web site may receive a selection of one of the one or more shipping option user interface elements for an item from a subscribed customer accessing a Web page of the Web site, for example an item detail page. As indicated at 212, the Web site may initiate and process an order of the item for the subscribed customer according to the selected shipping option in response to the selection of the shipping option on the Web page. As mentioned above, in one embodiment, the shipping option user interface elements may be single-action shipping option user interface elements. In this embodiment, in response to the single-action selection of the shipping option, the payment method of the subscribed customer may be automatically billed for the item and for shipping charges of the shipping option, if any, and the order processed to ship the item to the subscribed customer at a shipping address associated with the customer's subscription according to the selected shipping option. Note that, in some embodiments, selecting a shipping option user interface element may require additional action on the part of the customer to subscribe to the shipping program. For example, in one embodiment, selecting a shipping option user interface element may take the customer to another Web page through which the customer may subscribe to the shipping program by interacting with one or more additional user interface elements displayed on the Web page.

Note that, in some embodiments, other mechanisms for selecting shipping options available to subscribers of the shipping program than the mechanisms described above may be provided.

Figure 5:
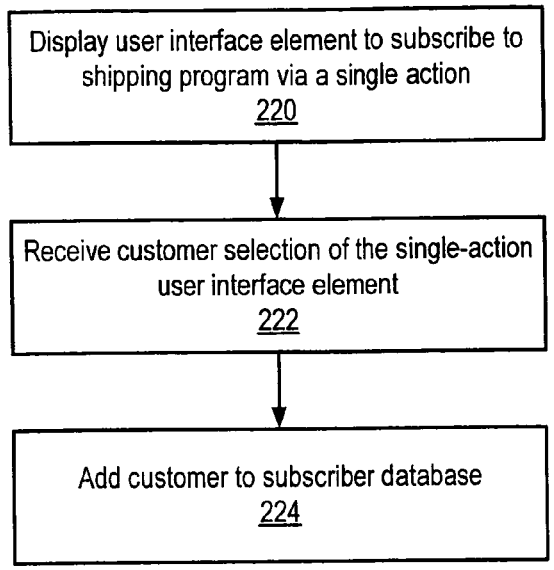
FIG. 5 is a flowchart illustrating a method of subscribing customers to a shipping program via a single action by the customer according to one embodiment.

FIG. 5 is a flowchart illustrating a method of subscribing customers to a shipping program via a single action by the customer according to one embodiment. As indicated at 220, the Web site may display a user interface element on a Web page or Web pages of the Web site when accessed by customers, such as a "subscribe now" button, to subscribe to shipping program via a single action (e.g., selecting the user interface element). The Web site may receive a customer selection of the single-action user interface element, as indicated at 222. The customer may then be automatically subscribed to the shipping program using information about the customer already available to the Web site, for example user information provided by the customer when setting up a user account with the Web site and stored in a customer database. As indicated at 224, the subscribed customer may be added to a subscriber database that stores information on customers subscribed to the shipping program.

Note that, if the Web site does not have enough information on the customer to issue a subscription to the customer, then the customer may be requested to enter at least some information to apply for a subscription. Also note that, if the customer is not logged into a user account on the Web site, the customer may be required to log in before the single-action subscription is available. In one embodiment, if the customer does not have a user account with the Web site, the customer may be required to set up a user account before a subscription can be purchased. Alternatively, subscribing to the shipping program may automatically create a user account for the customer.

Figure 6:
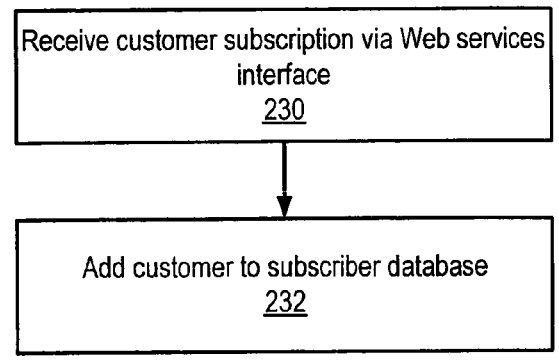
FIG. 6 is a flowchart illustrating a method of accepting subscriptions to a shipping program received via a Web services interface according to one embodiment.

FIG. 6 is a flowchart illustrating a method of accepting subscriptions to a shipping program received via a Web services interface according to one embodiment. In this embodiment, other servers may provide mechanisms for customers to subscribe to the subscription-based shipping program offered by the e-commerce enterprise. For example, a financial institution may offer to provide free subscriptions to the shipping program of the e-commerce enterprise for customers that sign up for, and are issued, a credit card. As indicated at 230, the e-commerce Web site may receive a customer subscription from another server via a Web services interface to the e-commerce Web site. As indicated at 232, the customer may then be added to a subscriber database that stores information on customers subscribed to the shipping program in response to the receipt of the customer subscription.

Figure 7:
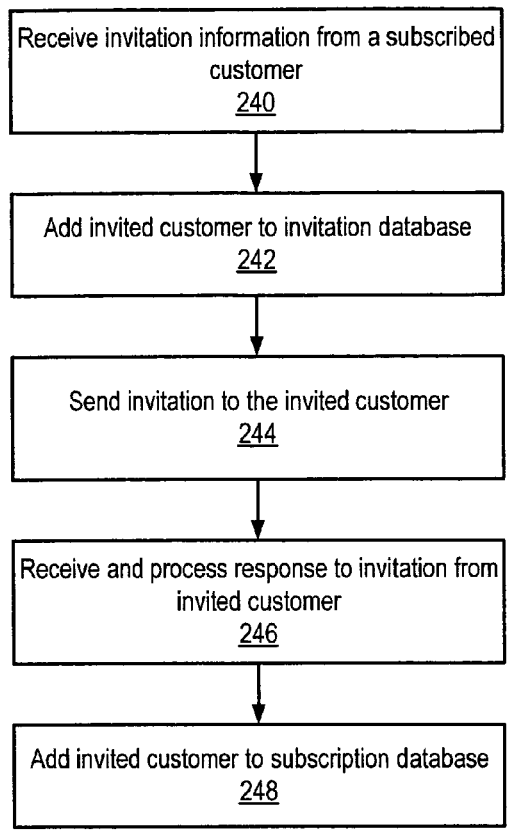
FIG. 7 is a flowchart illustrating a method of processing invitations to a subscription to a shipping program according to one embodiment.

FIG. 7 is a flowchart illustrating a method of processing invitations to a subscription to a shipping program according to one embodiment. As indicated at 240, the e-commerce Web site may receive invitation information from a subscribed customer, for example via a Web page on the Web site, that describes another customer with whom the subscribed customer desires to share the subscription As indicated at 242, the Web site may add the invited customer to an invitation database that stores information on customers that have been invited to share subscriptions to the shipping program. The Web site may then send a notification of the invitation to the invited customer using one of the methods described elsewhere herein, as indicated at 244. The Web site may then receive and process a response to the invitation from the invited customer, for example on a Web page provided by the Web site to the invited customer, as indicated at 246. As indicated at 248, if the invited customer accepts the invitation, the invited customer may be added to a subscriber database that stores information on customers subscribed to the shipping program in response to the receipt of the customer subscription.

Figure 8:
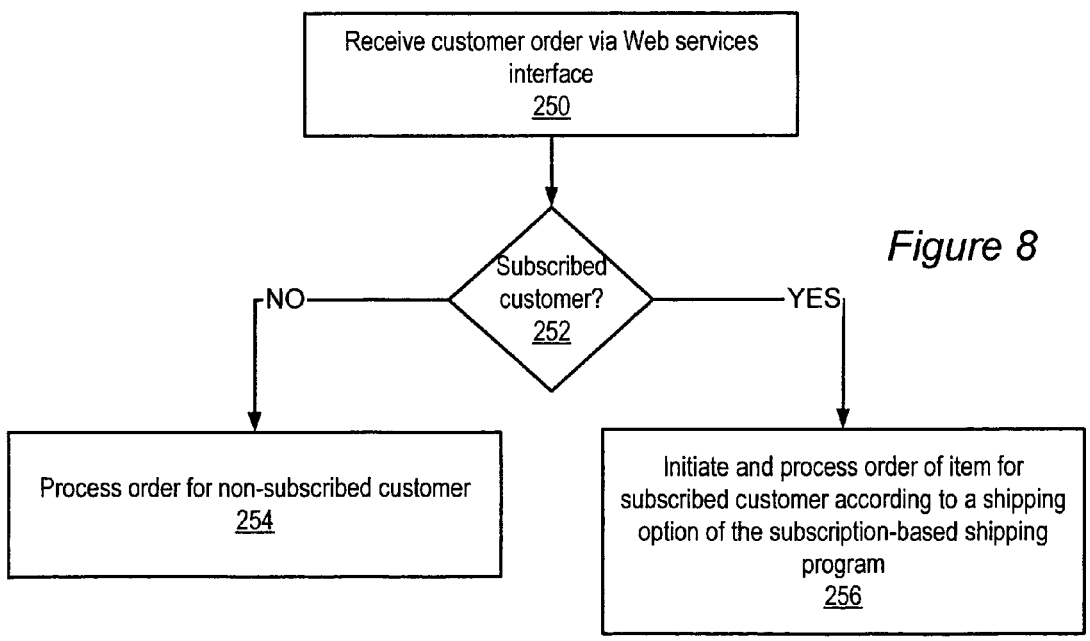
FIG. 8 is a flowchart illustrating a method of processing orders received via a Web services interface according to one embodiment.

FIG. 8 is a flowchart illustrating a method of processing orders received via a Web services interface according to one embodiment. In this embodiment, items offered for sale by the e-commerce Web site may be ordered via other mechanisms than the e-commerce Web site, for example via other Web sites associated with the e-commerce enterprise or with other enterprises. As indicated at 250, the e-commerce Web site may receive a customer order for one or more items via a Web services interface, such as the Web services interface described in FIG. 3. The Web site may then check the subscriber database, using customer information received in the customer order from the Web services interface, to determine if the customer that submitted the order is a subscribed customer. At 252, if the customer is not a subscribed customer, then the order may be processed as an order from a non-subscribed customer, as indicated at 254. If the customer is a subscribed customer, then the Web site may process the order for the item(s) specified in the customer order received through the Web services interface for the subscribed customer according to a shipping option of the subscription-based shipping program. The desired shipping option may be specified in the order information received through the Web services interface or, if no shipping option is specified, a default shipping option may be used.

Figure 9:
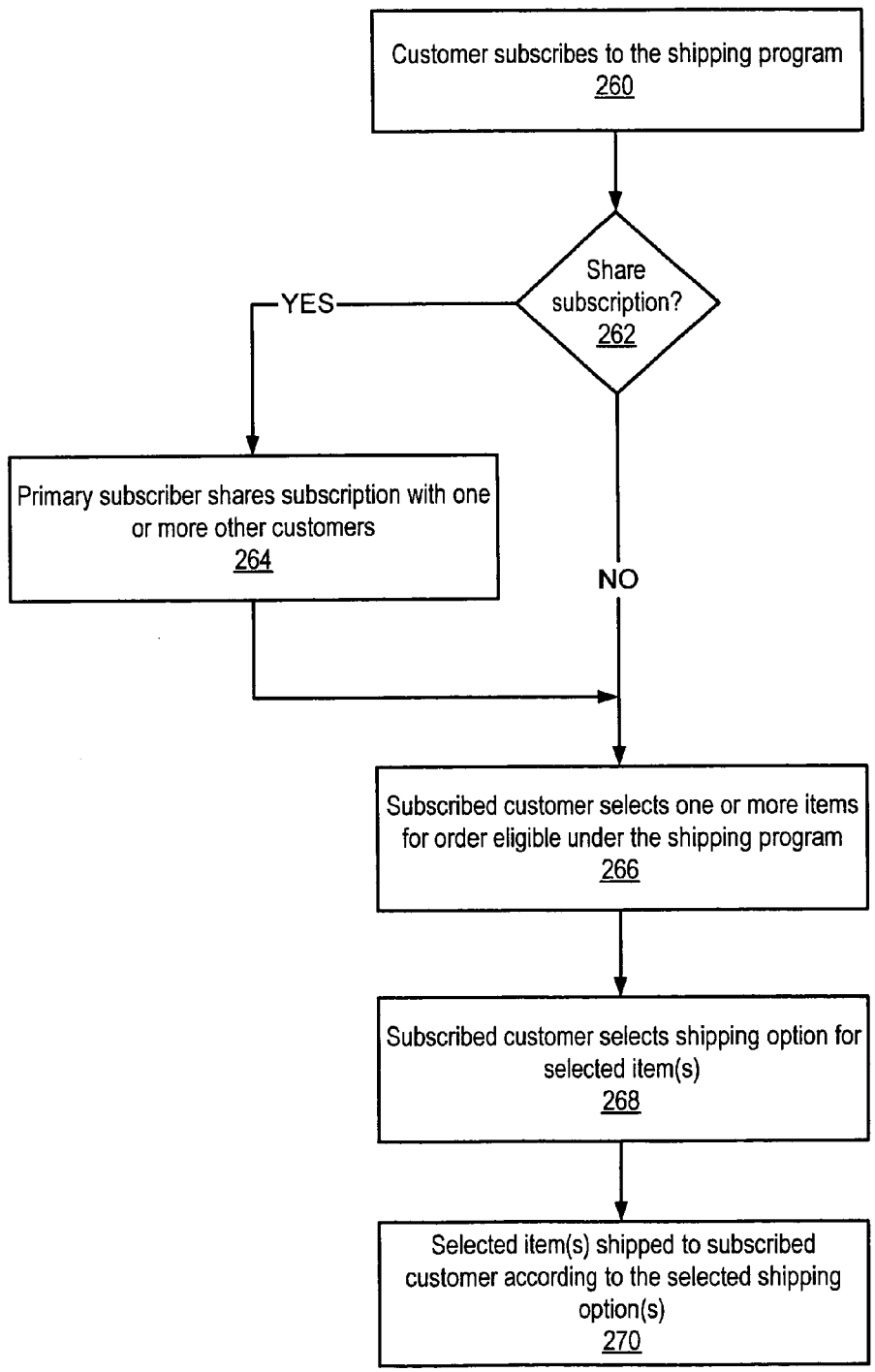
FIG. 9 is a flowchart of an exemplary process of a customer accessing and using the subscription-based shipping program according to one embodiment.

FIG. 9 is a flowchart of an exemplary process of a customer accessing and using the subscription-based shipping program according to one embodiment. As indicated at 260, a customer of the e-commerce enterprise subscribes to the subscription-based shipping program via the enterprise's e-commerce Web site. In one embodiment, the customer may pay a fixed fee for the membership. By subscribing and paying the fee, the customer is provided with reduced and/or free shipping for one or more shipping options (e.g. next-day shipping, 2-day shipping, etc) for the duration of the subscription.

In some embodiments, rather than having one fixed subscription fee, a tiered subscription system may be implemented, at which different tiers or levels of service are offered to the subscribing customer for different subscription fees. For example, one embodiment may offer tiered subscription fees bases on the expected number of items the customer will order over the period of the subscription. In this embodiment, for example, the subscribed customer may be eligible to take advantage of reduced or free shipping for items ordered under the program for 1 to 20 items at a fee of $20; 21 to 40 items at a fee of $30, 41 to 60 items at a fee of $50, and an unlimited number of items for a fee of $70. Shipping costs for items over the limit at the level the customer has paid for may be charged to the customer. As another example of a tiered subscription, a subscribing customer may subscribe to the program for different periods at different fees, for example six months for a fee of $50 or one year for a fee of $75. As yet another example of a tiered subscription, a subscribing customer may subscribe to the program at one of two or more levels of service, where one level is a "basic service" level that offers free or reduced shipping of at least some items for the period of the subscription, with one or more higher levels that offer additional services and/or further shipping discounts to the subscribing customer for higher subscription fees. For example, the basic service level may provide free 2-day shipping and $4 next-day shipping; a second level may provide free 2-day and next-day shipping, and a third level may provide free 2-day shipping, next-day shipping, and same-day shipping. Alternatively, certain items may be excluded from the program at the basic level, while a higher-level subscription offered for a higher fee may provide free shipping on all items offered by the product distributor. As another example, subscribers to higher levels may be offered special offers or services not provided to subscribers at the basic level, such as expedited handling of orders. Another example of a tiered subscription is a program that offers "residential" and "commercial" subscriptions, where a residential subscription allows the primary subscriber to share the subscription with some number of household members, for example four, while the commercial subscription, for a higher subscription fee, allows the primary subscriber to share the subscription with some larger number of employees of a business, condominium, apartment complex, etc.

As indicated at 262, the primary subscriber (the customer who paid for the subscription) may be provided the option to share the subscription with one or more other customers, for example one or more other residents of the primary subscriber's household, as indicated at 264. Customers with which the subscription is shared may be referred to as secondary subscribers. In one embodiment, the primary customer, upon selecting an option on the Web site's user interface to share the subscription, may be presented with a Web interface that allows the primary customer to send an invitation to a specified customer. In one embodiment, this invitation may be e-mailed to the invited customer. The invited customer may then access the Web site, or alternatively respond to the e-mail, to accept the invitation, or alternatively may ignore or reject the invitation. In another embodiment, rather than inviting other customers and having the invited customers accept or reject the invitation via the Web site or e-mail, the primary customer may be given the option to directly add one or more other customers to the subscription. These customers may then be automatically notified, for example by e-mail, that they have been added to the subscription.

In one embodiment, sharing a membership with other customers, such as other residents of the primary subscriber's household, may be based on an honor system. In one embodiment, the primary subscriber may invite another person in the household to participate. The invited person may receive an e-mail message from the e-commerce enterprise, and upon application to the program on the e-commerce enterprise's Web site, may be asked to supply their own birth date and the birth date of the primary subscriber (both of which may have been previously provided by the primary subscriber) for authentication purposes. If the birth dates provided by the invited customer match those provided by the primary subscriber, the invited customer is allowed to join the subscription. In other embodiments, other personal information may be used instead of or in addition to birth dates to verify invited customers. Allowing primary subscribers to invite other customers (e.g., other household residents) and requiring the primary subscriber to submit personal information for him or herself and for the invited customers, such as birthdays, for authentication, the enterprise may be able to maintain personalization of individual accounts and to obtain additional personal information for the primary and secondary subscribers. This personal information may be used, for example, in extending special, possibly personalized offers or services to the subscribers. In one embodiment, the e-commerce enterprise may audit subscribers, for example by checking on billing addresses, and may revoke the subscription and/or take other appropriate action in the event of subscriber misconduct, for example if a restriction is violated by inviting non-household members to join a subscription.

As indicated at 266, a subscribed customer (either the primary subscriber or a secondary subscriber) may select one or more items for order eligible under the shipping program from one or more pages of the e-commerce Web site. In one embodiment, one or more user interface elements specific to customers subscribed to the shipping program may be presented on the Web pages from which the items may be ordered, which may be referred to as item detail pages. User interface elements may include control elements, such as buttons, menus, text entry boxes, tabs, links to other Web pages, etc., that the user may interact with via input devices such as keyboards and cursor control devices to enter information, select from two or more options, and/or initiate associated actions indicated by the control elements on the Web page/Web site. User interface elements may also include indicator elements such as text, scrolling text boxes, images, banners, and other user interface elements configured to display information to the user graphically and/or textually. In one embodiment, these user interface elements may be grouped together in an area or "stripe" specific to subscribers on the Web page(s). These user interface elements may tell the subscriber how their subscription may apply to whatever they may wish to do on the particular Web page being viewed, and may allow the subscriber to invoke the options available via the subscription for that particular Web page; different Web pages may display different sets of user interface elements specific to the subscription-based shipping program. In one embodiment, these user interface elements are only presented to subscribed customers; non-subscribed customers are not presented with the user interface elements specific to subscribers of the shipping program when accessing the Web pages of the e-commerce Web site. These user interface elements may include one or more user interface elements (e.g., buttons or menus) for selecting from one or more shipping options offered under the subscription-based shipping program. Note that the Web page may also include one or more other user interface elements that may include other shipping options that are not part of the shipping program.

As indicated at 268, the subscriber may select one of the one or more shipping options available under the shipping program for each item that the subscriber chooses to order, or alternatively some other shipping option if the subscriber chooses not to use one of the program's shipping options. After the subscriber completes the ordering of the item(s) from the e-commerce Web site, the selected item(s) may be shipped to subscribed customer according to the selected shipping option(s), as indicated at 270. Note that different items that the subscriber ordered may be shipped to the subscriber according to different shipping options selected by the subscriber. Also note that two or more items for which the same shipping option was selected may be collectively shipped to the customer in one shipment.

In one embodiment, shipping options offered by the program for ordered items may 20; be "ship the items as soon as possible" rather than "ship all ordered items together." In this embodiment, under the subscription-based shipping program, there may be no reason for a subscriber to wait to have an item shipped; single items may be shipped under the program to get to the subscriber as soon as possible.

In one embodiment, a primary subscriber may be required to agree to the consolidated fulfillment of the subscriber's orders (and possibly the orders of secondary subscribers as well), or alternatively may optionally select the consolidated fulfillment of the subscriber's orders. In this embodiment, subscribers' orders are consolidated at fulfillment time across many orders over a period (e.g., one or two weeks) rather than "consolidating" at order time as is done in the "ship the items as soon as possible" model. Consolidation of orders, or "ship all ordered items together", may save on shipping charges as it may allow the product distributor to ship as many items in the same package or same shipment as possible, so it may be cost-effective to require the subscriber to use this option or to provide the subscriber with the option to have multiple ordered items consolidated and shipped together. In this embodiment, the order fulfillment center(s) of the product distributor may be configured to ship items from multiple orders to one shipping address in a single shipment. Items ordered by a primary subscriber and/or secondary subscribers under the program may be consolidated and shipped to the subscription's primary shipping address, or alternatively to another shipping address, periodically or aperiodically, for example once a week, once every two weeks, every Friday, every other Monday, twice a month, when a certain number or cost of items have been ordered, etc., as specified by the program or, alternatively, as options offered by the program. In one embodiment, a subscriber may be allowed to order items over time and select when the items are to be shipped and/or delivered, rather than having periodic, scheduled shipment of orders or having the items shipped when ordered. For example, the subscriber may be allowed to order items and then select "Go ahead and ship all items", or to specify a date that is convenient for the customer on which the ordered item or collection of consolidated, ordered items are to arrive at the subscriber's shipping address. In one embodiment that requires consolidation, a subscriber may be given the option to override the scheduled shipping of consolidated items for one or more ordered items to have the particular ordered items shipped as soon as possible. An additional fee may be charged to the subscriber for using this option.

Customers may be used to items being shipped when ordered. If consolidating and shipping periodically, or "ship all ordered items together" is required, this information (that items may not be shipped when ordered, and instead will be consolidated and periodically shipped to the subscriber) may be clearly communicated to the subscriber to insure that that they understand and are satisfied with the condition for subscription in the shipping program. As noted above, in one embodiment, consolidation may be offered as an option to "ship the items as soon as possible". In one embodiment, a tiered subscription schedule may be provided where the subscriber may be able to pay a higher fee to not consolidate orders (i.e., "ship the items as soon as possible"), and a lower fee that requires consolidation of orders. Some customers may value time over money, and thus may opt to pay a higher fee to have their items shipped as soon as possible.

To summarize, in various embodiments, either "ship the items as soon as possible" or "ship all ordered items together" (consolidation) may be the required shipping method, or "ship the items as soon as possible" may be offered as the default while "ship all ordered items together" may be offered as an option, or vice versa. In addition, various periods and other options may be offered for the "ship all ordered items together" shipping method.

In one embodiment, a subscribing customer may be required, or alternatively may optionally select, to have the customer's orders shipped on specified, periodic shipping dates. In this embodiment, the product distributor may ship orders to a subscribed customer (which may either be required by the subscription-based shipping program or offered as an option to the customer by the program) on scheduled, periodic shipping dates, for example once per week, once a month, twice per month, every other Friday, etc. In one embodiment, the subscriber may be able to override the shipping options offered through the program and select other shipping options, such as same-day shipping, for which the subscriber may be billed at normal (or possibly reduced) shipping rates or rates according to other special offers or programs.

Note that the shipping options provided by the subscription-based shipping program may not be available for all items offered by the e-commerce enterprise's Web site; for example, large and/or heavy items may be excluded from the program. The subscriber may be billed for shipping for these non-eligible items. Items may be excluded from the program for a variety of reasons, including, but not limited to: size, weight, special shipping requirements, price, etc. In one embodiment, non-eligible items are indicated as such on the item detail pages associated with the items; eligible items may also be so indicated. For example, an item detail page for a non-eligible, item may indicate to the customer that "This item is not eligible under the subscription-based shipping program", and the user interface elements for selecting a shipping option under the program may not be displayed or, alternatively, may be displayed but disabled. An item detail page for an eligible item under the program may indicate to the customer that "This item is eligible under the subscription-based shipping program; the user interface elements for selecting a shipping option under the program may be displayed and enabled. In one embodiment, additional information as to why an item is ineligible may be provided to the user, either by direct display on the item detail page or alternatively through a link to another Web page.

Note that 262 through 270 of the flowchart illustrated in FIG. 9 are iterative, and may be repeated by the subscriber, or performed in different orders, during the duration of the subscription. For example, the primary subscriber may elect at any time during the subscription to share the subscription with another customer. Also note that, in one embodiment, the primary subscriber may be given the option to remove secondary customers at any time, and/or to cancel invitations to share the membership previously extended to customers.

Some embodiments may offer or provide additional benefits to subscribers of the subscription-based shipping program not offered to non-subscribed customers. Subscribers may be given exclusive or first access to certain products or services. For example, subscribers may be given the opportunity to purchase autographed copies of books, first editions, or other special-edition or special offer products that are not offered or sold to the general public (i.e., non-subscribed customers of the e-commerce enterprise) or before the items are offered to non-subscribed customers. As another example, items ordered by the subscriber may be "flagged" and given special handling during order fulfillment. Subscribers' orders may be moved to the head of the queue of orders placed by non-subscribed customers. Orders placed by subscribers may be processed and fulfilled at a higher priority than orders placed by non-subscribed customers; the picking, value-added processing, packing and shipping of orders placed by subscribers may be given higher priority than non-subscribed customers. Other special services or offers that may be provided to subscribed customers may include one or more of, but are not limited to: the ability to return purchased items at no charge; free magazine subscriptions; free gift wrapping, engraving and/or other value-added services; access to premium digital content; preferred allocation of constrained items; pre-release access to certain items; wireless service bonuses (e.g., free minutes, better rate plans, etc); discounts on higher-margin services such as warranties, or even free warranties; free order sweepstakes; premier customer sales; etc.

Figure 10:
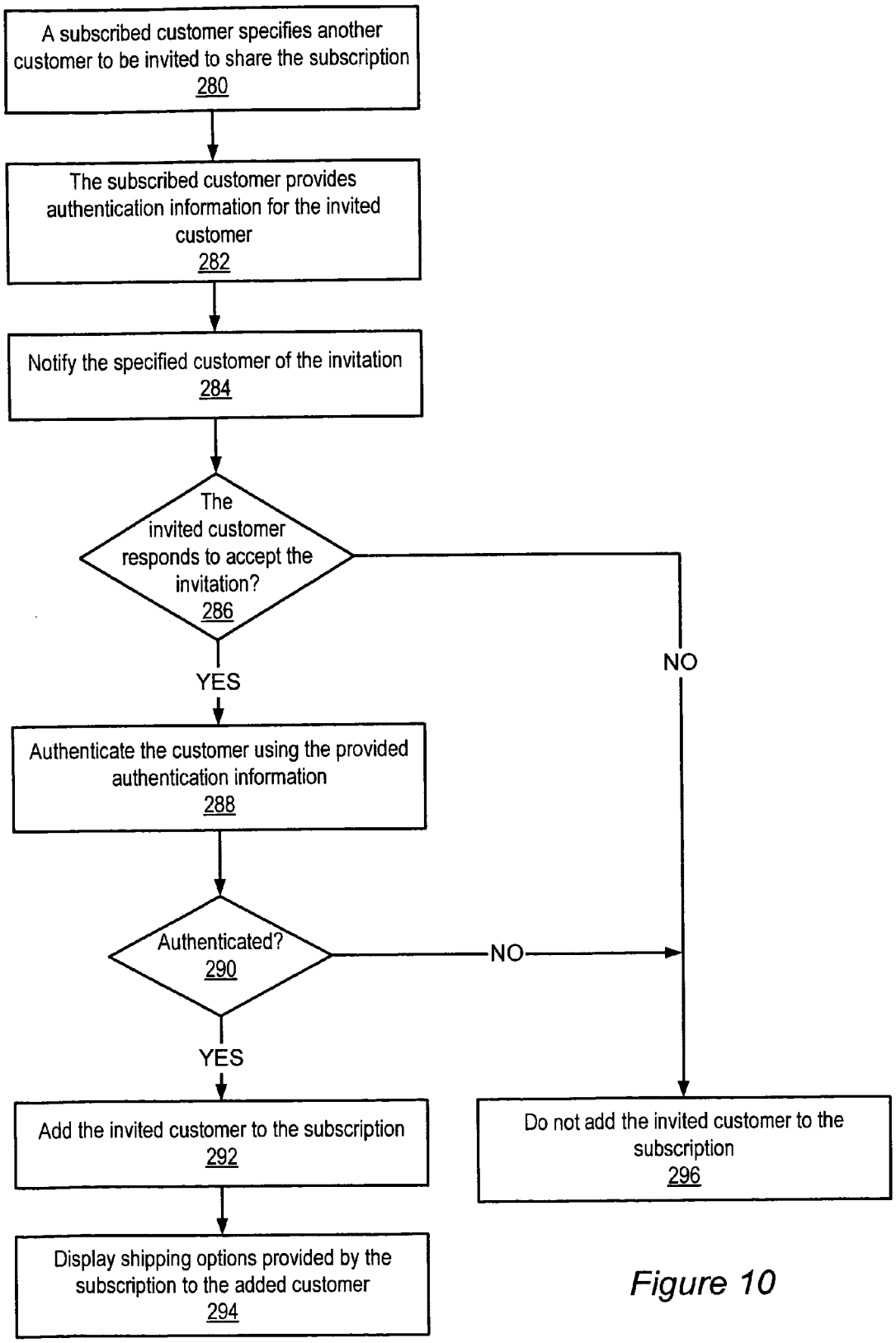
FIG. 10 is a flowchart of an exemplary process of a subscriber inviting another customer to share a subscription in the subscription-based shipping program according to one embodiment.

FIG. 10 is a flowchart of an exemplary process of a subscriber inviting another customer to share a subscription in the subscription-based shipping program according to one embodiment. As indicated at 280, a subscribed customer specifies another customer to be invited to share the subscription, for example another member of the subscribed customer's household. In one embodiment, the e-commerce Web site may provide an invitation user interface, for example a Web page such as the exemplary Web page illustrated in FIG. 14, through which a subscribed customer may invite other customers to share the subscription. Through one or more user interface elements of the invitation user interface, the subscribed customer may be asked to provide information about the invited customer. This information may include one or more of, but is not limited to, the invited customer's name, relationship to the subscribed customer, and e-mail address. As indicated at 282, the subscribed customer may also be asked to provide information to be used in authenticating the invited customer, for example the birth dates of the subscribed customer and the invited customer and/or at least a portion of the credit card number through which the subscription was paid.

The invitation user interface may also include a user interface element, for example a button, through which the subscribed customer may submit the invitation. Selecting this user interface element may cause a notification of the invitation to be sent to the invited customer, as indicated at 284. Note that selecting this user interface element may generate an error message if some of the information entered by the subscribed customer via the invitation user interface is missing or incorrect. The subscribed customer may then enter the missing information and/or correct the information and resubmit the invitation. The notification may be sent via e-mail, may be provided to the invited customer when the customer next logs in to the Web site, and/or may be sent to the invited customer using some other mechanism. The invitation may include some mechanism or mechanisms via which the invited user may respond to the invitation, for example a link to a Web page on which the invited customer may accept (or, in some embodiments, accept or reject) the invitation. Alternatively, the invitation may be an e-mail message, and the invited customer may reply to the e-mail message to accept (or, in some embodiments, to accept or reject) the invitation.

As indicated at 286, if the invited customer responds to accept the invitation, the responding customer may be authenticated using the authentication information provided by the subscribed customer as indicated at 288. For example, the invited customer may be asked to provide the birth date of the subscribed customer and the invited customer's birth date to authenticate the invited customer. If the invited customer does not respond to the invitation, then the customer is not added to the subscription, as indicated at 296. The invitation may remain as an issued invitation that has not been responded to, and mechanisms may be provided through which the invited customer may later accept the invitation, and/or mechanisms through which an invited customer may periodically or aperiodically be reminded of the outstanding invitation.

As indicated at 290, if the authentication is successful, then the invited customer may be added to the subscription as indicated at 292. As indicated at 294, once the invited customer is authenticated added to the subscription, then user interface elements for shipping (or other) options provided by the subscription may be displayed on various Web pages of the e-commerce Web site, for example item detail pages, when accessed by the added customer. If the authentication is not successful (e.g., if the responding customer cannot provide the correct authentication information), then the responding customer is not added to the subscription, as indicated at 296.

While embodiments are generally described as subscriptions that may be extended to other members or residents of a household, note that other groups of individuals than households may be allowed to share subscriptions. For example, businesses, business locations, apartment complexes or condominiums, schools, or other entities may be allowed to purchase and share subscriptions among members of the entities or "communities". In one embodiment, a tiered fee schedule may be provided for different types of entities and/or for different numbers of members expected to share the membership. For example, a condominium complex may be allowed to purchase a subscription to the shipping program and to invite residents of the complex to share the membership if they so desire. This allows the product distributor to ship orders to multiple members of the entity as a community. There may be a scheduled delivery day, for example every Friday, and the orders may all be delivered to one shipping address, for example the office of the condominium complex, where the orders may be picked up by the subscribers. There may be many members of the community that participate as subscribers, but the members each maintain their individual identity and accounts with the product distributor's e-commerce Web site, but share one subscription in the shipping program. Allowing multiple members of a community to subscribe while maintaining individual customer identity enables the product distributor to track the individual subscribers' ordering of items and personal information, as the subscribers still log in to own accounts but share the same subscription.

User Interface

Embodiments may provide a Web-based user interface including an e-commerce Web site or sites with at least some Web pages including user interface elements such as menus, buttons, controls, tabs, etc., that allow a customer to subscribe to the shipping program, access the membership options when ordering items from the enterprise's e-commerce Web site to take advantage of the free or reduced-rate shipping provided by the program if available for the item, extend invitations to the membership to one or more other customers (e.g., members of the subscriber's household), view and manage information about the subscriber's membership in the program, invited customers, and invited customers who have joined as secondary subscribers, and perform other tasks related to membership in the subscription-based shipping program. Exemplary Web pages and mechanisms for that may be provided to members of the subscription-based shipping program through an e-commerce enterprise's software system are described below. An exemplary system architecture for implementing the Web-based user interface and the underlying mechanisms for managing and operating the subscription-based shipping program is also described.

In one embodiment, to subscribe to the shipping program, a customer may sign in to the customer's account with the e-commerce Web site or create a new customer account, if not already registered. Creating an account may require the customer to enter various items of information, for example the user name, credit card information, e-mail address, billing and shipping address, etc. The customer account may thus include information that may be used in providing a subscription; for example, the user name, credit card information, billing and shipping address, etc. Optionally, this information may be requested or edited when subscribing to program.

After the customer is logged in to the customer's account, one or more Web pages on the e-commerce Web site that the customer accesses may provide advertisements and/or information about the subscription-based shipping program, and may also provide a user interface element or elements, for example a button, to allow the user to subscribe to the shipping program. Note that the information about and the option to subscribe to the shipping program may be presented on various pages of the Web site before and/or after customer signs on to the customer's account. The signed-on customer may use this information and user interface elements to navigate to a shipping program subscription page, or alternatively selecting a single user interface element may automatically subscribe the customer (possibly with verification, as the customer will be billed for the subscription). Subscription to the shipping program may use the default information from the customer's account, or the subscriber may optionally be allowed to edit the information (e.g., to change the credit card/billing information or shipping address) used in the subscription. The subscription may be confirmed with the customer by e-mail notification or by some other mechanism.

Once a customer has subscribed to the shipping program, the customer's account is associated with the subscription by the e-commerce enterprise's software system for the duration of the subscription. The subscription may be automatically renewed, and the customer billed accordingly, at the expiration of the subscription. Notification of the renewal of the subscription may be provided to the subscriber, who may be given the option to decline the renewal. The customer may be given the option to not automatically re-subscribe to the shipping program if the customer so desires.

One embodiment may provide a subscription/account management Web page that may be accessed by the primary subscriber where the primary subscriber may be allowed to perform various actions to manage various aspects of the subscription to the program, such as offering invitations to share the subscription to other customers. Some embodiments may allow the primary subscriber to share the subscription to in the shipping program with one or more other customers, for example other members of the subscriber's household, who may be referred to as secondary subscribers. In these embodiments, the user interface of the e-commerce Web site may provide one or more Web pages through which the primary subscriber may share the membership in the program, at no additional charge or, alternatively, for an additional fee, with one or more other customers. In one embodiment, the user interface of the e-commerce Web site may provide one or more Web pages or user interface elements on Web pages via which the primary subscriber may invite one or more other customers to share the membership. The invited customer may be notified of the invitation via e-mail, via the user interface of the Web site when the customer logs on to his or her own account on the Web site, and/or by some other notification method. The invited customers may then accept the invitation to become secondary subscribers, reject the invitation, or simply ignore the invitation. In one embodiment, the invited customers may be required to be customers with accounts on the Web site, or alternatively may be required to register and thus create a personal account on the Web site, before the invitation is approved by the e-commerce enterprise software system. Alternatively, the primary subscriber may be allowed to directly add one or more customers to the subscription without issuing an invitation.

In one embodiment, a subscriber (either the primary subscriber or a secondary subscriber) may access the shipping options provided by the program via a subscription-based shipping program user interface, which may be a user interface strip, stripe, bar, or some other subscription-based shipping program user interface area or collection of user interface elements that may be displayed on each relevant Web page (e.g., item detail pages from which items associated with the pages may be ordered) of the e-commerce enterprise's Web site. In one embodiment, the shipping program user interface will only be displayed to subscribers that are logged on to their accounts; non-subscribers will not be presented the shipping program user interface elements on accessed Web pages, though advertisements for the subscription-based shipping program and user interface elements through which the customers may subscribe to the program may be displayed on an accessed Web page.

In the shipping program user interface, one or more buttons, menus, text boxes, or other user interface elements may be displayed that allow the subscriber to select one of the one or more shipping options for the item available to the subscriber through the program. From an item detail page, the subscriber may select one of these one or more user interface elements each representing a shipping option under the shipping program and the item will be ordered for the subscriber and shipped to the subscriber according to the selected shipping option. The subscriber's previously specified billing address and credit card or other payment method information may be used as default information in generating the order for the item and in billing the subscriber. A previously specified shipping address for the subscriber may be used as the default shipping destination for the ordered item. The subscriber may be given the option to modify any of this information if desired.

FIGS. 11 through 18 illustrate exemplary Web pages that may be provided by an e-commerce Web site to enable various functions and features of the subscription-based shipping program according to one embodiment. Note that, in some embodiments, other Web pages than the exemplary Web pages illustrated in these Figures may be provided by the e-commerce Web site that include one or more user interface elements related to the subscription-based shipping program.

Note that, in the exemplary Web pages of FIGS. 11 through 18, the customer interface to the subscription-based shipping program is shown as a GUI that is suitable for screen display on a personal computer or other similar large-screen device. In some embodiments, implementations of the subscription-based shipping program may be presented on any suitable device, for example on a Personal Digital Assistant (PDA) or other handheld device, on a cell phone using audio prompts, etc, using any of a variety of other presentation methods, screens, user interface elements, etc.

Figure 11:
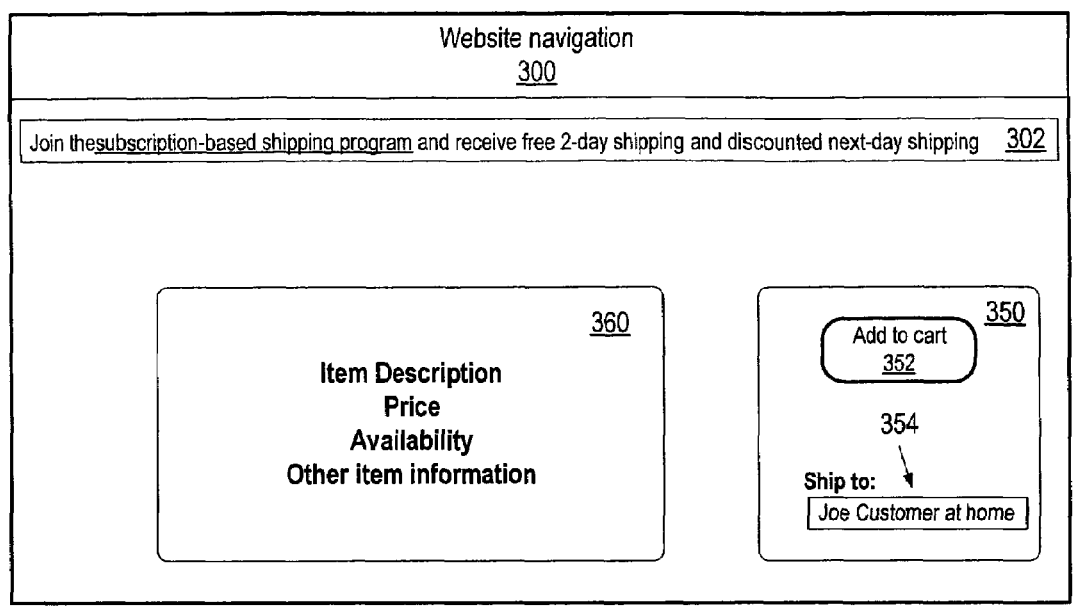
FIG. 11 illustrates an exemplary Web page that includes an offer to join the subscription-based shipping program, according to one embodiment.

FIG. 11 illustrates an exemplary Web page that displays an offer to join the subscription-based shipping program, according to one embodiment. This example is an item detail page, but note that similar offers to join the shipping program may be provided on one or more other Web pages of the Web site, such as the "home" page. Website navigation 300 may include one or more user interface elements, such as buttons, tabs menus, etc., through which the customer may navigate to other pages on the Web site and/or perform other functions, such as searches. Item detail area 360 may describe relevant graphical and/or textual information about the item associated with this item detail Web page, such as an item description, price, availability of the item, and other item information such as a picture of the item. User interface area 350 may include one or more user interface elements for selecting standard options of the e-commerce Web site, such as an "Add to cart" button 352 that allows the user to add the item shown on the Web page to a collection, or cart, of items that the user may purchase when done selecting items. Area 350 may also include a user interface element 354, such as a pop-up menu or text box, through which the user may select a shipping address for the item, if ordered. This item 354 may default to a default shipping address of the current user's account. Note that the information in areas 350 and 360 may be displayed for all customers of the Web site, and not just to subscribers to the shipping program.

A banner, bar, button, or other user interface element or area 302 may display an offer to subscribe to the subscription-based shipping program. This area 302 may be or may include a user-selectable user interface element that, when selected, may take the customer to a Web page, such as one of the exemplary Web pages illustrated in FIGS. 12A through 12C, on which the customer may subscribe to the shipping program. In this example, the underlined words "subscription-based shipping program" may represent a user-selectable link to another Web page on which the customer may subscribe to the shipping program. Alternatively, 302, or a portion of 302 such as the underlined words "subscription-based shipping program", may be a single-action user interface item that, when selected by the customer, may automatically subscribe the customer to the subscription-based shipping program, if the customer is qualified. In one embodiment, area 302 may include a user interface element that, when selected, displays more information about the shipping program.

Note that, in one embodiment, 302 may not be displayed to customers that are known to be subscribers to the shipping program.

Figure 12A:
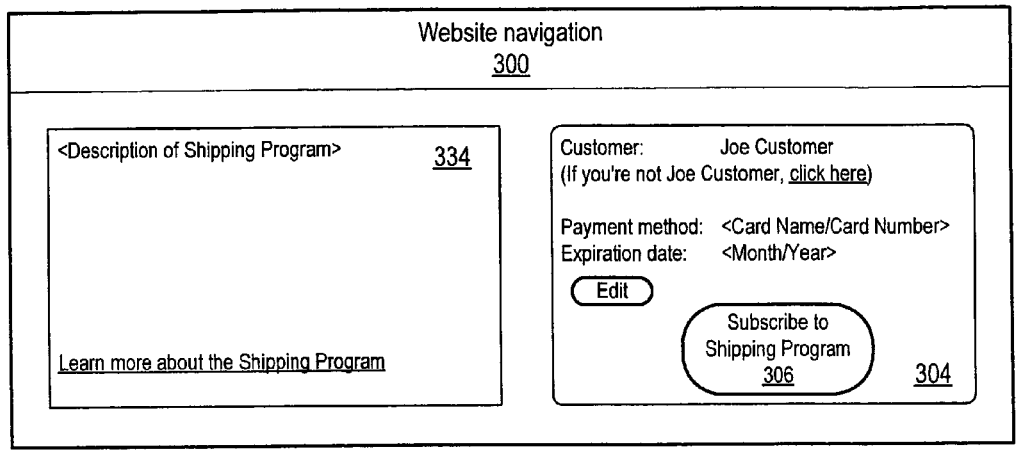
FIGS. 12A through 12C illustrate exemplary Web pages via which customers of the e-commerce Web site may subscribe to the subscription-based shipping program according to one embodiment.
Figure 12B:
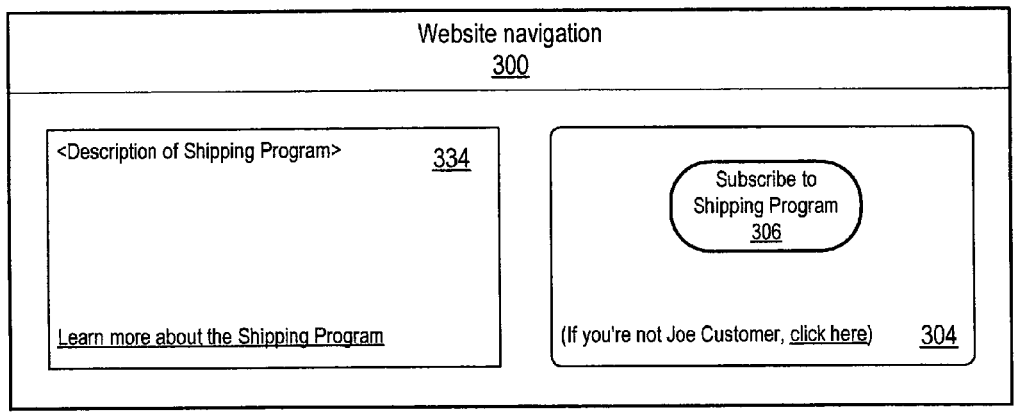
Figure 12C:
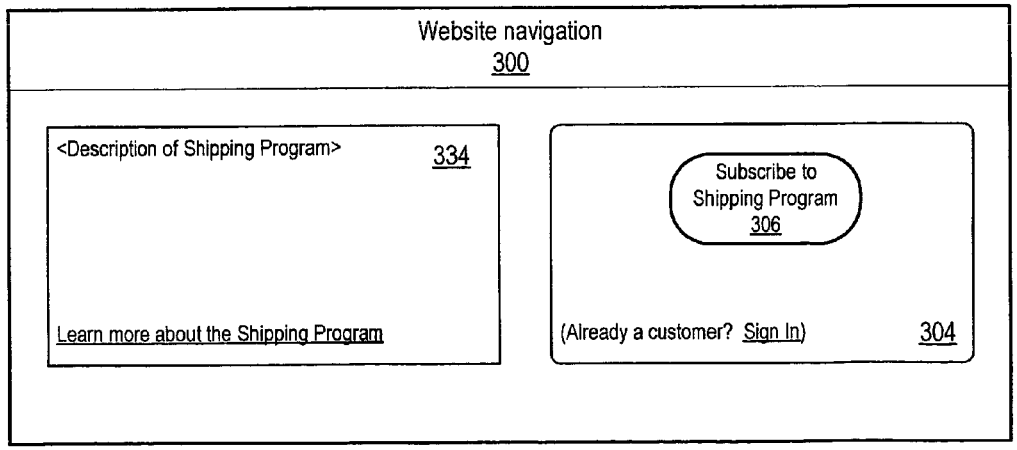

FIGS. 12A through 12C illustrate exemplary Web pages via which customers of the e-commerce Web site may subscribe to the subscription-based shipping program according to one embodiment. In one embodiment, selecting 302 or a portion of 302 of the exemplary Web page illustrated in FIG. 11, or a similar user interface element on another Web page, may cause an appropriate one of these Web pages to be displayed. A particular one of the exemplary Web pages of FIGS. 12A through 12C may be displayed depending on the status of the customer accessing the Web page.

On the exemplary Web pages of FIGS. 12A through 12C, website navigation 300 may include one or more user interface elements, such as buttons, tabs menus, etc., through which the customer may navigate to other pages on the Web site and/or perform other functions, such as searches. Shipping program description area 334 may display information describing the shipping program, such as the benefits, cost, and terms of the shipping program, and may also display a user interface element that, when selected, causes more detailed information about the shipping program to be displayed, either on the same Web page or on another Web page displayed to the customer. Sign-up area 304 may include a "subscribe" user interface element, such as button 306, the selection of which may take the customer to another Web page on which the customer may subscribe to the shipping program or, alternatively, may be a single-action user interface element, the selection of which automatically subscribes the customer to the shipping program with no further action required of the customer.

The exemplary Web page of FIG. 12A may be displayed for recognized customers, for example customers that are currently logged on to a user account for the Web site, and/or for which a preferred or default payment method is known. Sign-up area 304 may include information about the customer, such as the customer's name and a preferred or default payment method of the customer, such as a credit card, that the Web site knows through its record of the customer in the customer database. Sign-up area 304 may also include a user interface element that the customer may select if the customer viewing the Web page is not the customer for which the information is displayed. Sign-up area 304 may also provide the option for the customer to edit the information displayed about the customer, such as the payment method to be used for the subscription, if the customer so desires.

The exemplary Web page of FIG. 12B may be displayed for recognized customers, for example customers that are currently logged on to a user account for the Web site, for which a preferred or default payment method is not known. Sign-up area 304 may include information about the customer, such as the customer's name, but does not display a preferred or default payment method of the customer. Sign-up area 304 may also include a user interface element that the customer may select if the customer viewing the Web page is not the customer for which the information is displayed. Note that, from this Web page, to subscribe to the shipping program, for example by selecting a "subscribe" user interface element, such as button 306, the user may be required to specify or select a payment method for the subscription.

The exemplary Web page of FIG. 12C may be displayed for unrecognized customers, for example customers that are not currently logged on to a user account for the Web site. Sign-up area 304 may include a user interface element or elements through which the customer may log into the customer's user account on the Web site, if the customer has a user account.

Alternatively, or in addition, sign-up area may include a user interface element or elements through which the customer may open a user account to the Web site. Note that, from this Web page, to subscribe to the shipping program, for example by selecting a "subscribe" user interface element, such as button 306, the user may be required to open a user account with the Web site or, alternatively, subscribing to the shipping program may automatically generate a user account for the customer using information provided by the customer during the subscription process.

FIG. 13 illustrates an exemplary Web page via which a primary subscriber may view information about the subscription, including information on invited customers that have not yet accepted the invitations and customers that have accepted previous invitations and thus currently are secondary subscribers to the subscription, according to one embodiment. Website navigation 300 may include one or more user interface elements, such as buttons, tabs menus, etc., through which the subscriber may navigate to other pages on the Web site and/or perform other functions, such as searches. Primary subscriber information 306 may display relevant information about the primary subscriber, such as the subscriber's name, birth date, payment method, and subscription dates (i.e., the start and end dates for the current subscription). The user interface may also include an indication as to when the subscription is scheduled to expire, and a button 310 or other user interface element that may allow the primary subscriber to opt not to have the subscription automatically renewed on the expiration date.

Pending invitations 312 may display any customers that have been invited to share the subscription but that have not yet accepted the invitation. Relevant information about an invited customer, such as the customer's name, relationship to the primary subscriber, e-mail address, and birth date, may be displayed. One or more user interface elements, such as buttons, may be provided that allow the primary subscriber to manage the pending invitations. For example, a "reinvite" button 314 may allow the primary subscriber to reinvite a previously invited customer. Selecting this item may, for example, generate a new notification, such as an e-mail message, to the invited customer. An "edit" button 316 may allow the primary subscriber to edit the information about the invited customer, for example to change the e-mail address and/or birth date. A "remove" button 318 may allow the primary subscriber to remove the invited customer. Selecting this item may generate a notification, such as an e-mail message, to the invited customer that the invitation has been withdrawn.

Accepted invitations 320 may display any customers that have accepted invitations to share the subscription, and are thus secondary subscribers to the subscription. Relevant information about each secondary subscriber, such as the secondary subscriber's name, relationship to the primary subscriber, e-mail address, and birth date, may be displayed. One or more user interface elements, such as buttons, may be provided that allow the primary subscriber to manage the secondary subscribers. For example, an "edit" button may allow the primary subscriber to edit the information about the secondary subscriber, for example to change the e-mail address and/or relationship. A "remove" button may allow the primary subscriber to remove the secondary subscriber from the subscription. Selecting this item may generate a notification, such as an e-mail message, to the secondary subscriber that the customer's subscription has been removed by the primary subscriber.

Note that the underlying e-commerce enterprise software system may track and associate customer accounts, subscriptions, invited customers, primary subscribers, and secondary subscribers. In one embodiment, the software system may include "collections" of customers that are associated with a subscription. In one embodiment, user account information used by the software system (e.g., a database) may include fields that may be used by the software system to record and track which subscriptions, if any, a user account is currently associated with, and what that association or associations are. This information may be used to indicate which subscriptions, if any, the user is a primary subscriber for; which subscriptions, if any, the user has been invited to share; which subscriptions, if any, the user has accepted invitations to and thus is a secondary subscriber to; which other users, if any, a primary subscriber has invited to share a subscription; etc.

FIG. 14 illustrates an exemplary Web page via which a primary subscriber may invite other customers to share the subscription to the shipping program according to one embodiment. Website navigation 300 may include one or more user interface elements, such as buttons, tabs menus, etc., through which the subscriber may navigate to other pages on the Web site and/or perform other functions, such as searches. Primary subscriber information 306 may display relevant information about the primary subscriber, such as the subscriber's name, payment method, and subscription dates (i.e., the start and end dates for the current subscription). The user interface may also include an indication as to when the subscription is scheduled to expire, and a button 310 or other user interface element that may allow the primary subscriber to opt not to have the subscription automatically renewed on the expiration date.

Invitation interface area 330 may include invitation information including instructions on how to invite other customers to share the membership according to one embodiment. Invitation area 330 may also include one or more user interface elements, such as pop-up menus or text boxes, that the subscriber may access to provide information about a customer to be invited, such as the customer's name, e-mail address, relationship to the primary subscriber, and birth date, at least some of which may be used to authenticate the customer (e.g., the invited customer's birth date) if and when the customer decides to accept the invitation, personal information (in this example, the primary subscriber's birth date) which may be used in authenticating the invited customer, and a user interface element, such as button 332, to issue the invitation, once the required information has been filled in. Selecting "Invite" button 332 may generate an e-mail or other notification to the invited customer. Once the invited customer receives the notification, the customer may respond to the notification to accept the invitation. In one embodiment, the customer may reply to the e-mail to confirm that the customer accepts the invitation, or to reject the invitation. In another embodiment, the e-mail notification or other notification may include a link to a Web page on the e-commerce enterprise's Web site at which the invited customer may accept (or reject) the invitation.

Note that, in one embodiment, the user interface elements of the exemplary Web pages illustrated in FIGS. 13 and 14 may be combined in one Web page through which a subscriber may view information about invited customers and customers that have accepted invitations to share the subscription and invite other customers (e.g., members of the subscriber's household) to share the subscription. In this embodiment, a Web page may be provided that includes, but is not limited to, pending invitations 312 and accepted invitations 320 of FIG. 13 and invitation interface area 330 of FIG. 14.

FIG. 15 illustrates an exemplary Web page through which an invited customer may accept an invitation to share a subscription according to one embodiment. Website navigation 300 may include one or more user interface elements, such as buttons, tabs menus, etc., through which the customer may navigate to other pages on the Web site and/or perform other functions, such as searches. A shipping program description area 334 may display information describing the shipping program, such as the benefits, cost, and terms of the shipping program, and may also display a user interface element that, when selected, causes more detailed information about the shipping program to be displayed, either on the same Web page or on another Web page displayed to the customer. Shipping program description area 334 may also display a message informing the customer as to who invited the customer to share a subscription.

An invitation authentication and acceptance area 336 may include one or more user interface elements for the invited customer to enter the birth dates of the primary subscriber and the invited customer, or alternatively other information such as the last four digits of the primary subscriber's credit card, to be used to authenticate the customer. An "accept invitation" user interface element, such as a button, may also be displayed. If the customer selects "accept invitation" and they have entered the correct authentication information, then they may be added as a secondary subscriber to the subscription. In adding the secondary subscriber, the invitation and subscription collections may be updated. In one embodiment, the secondary customer may then be directed to a shipping program subscription main detail page (such as the exemplary Web page illustrated in FIG. 13) for the subscription with which they are now associated (i.e. to which they are a secondary subscriber).

Figure 16:
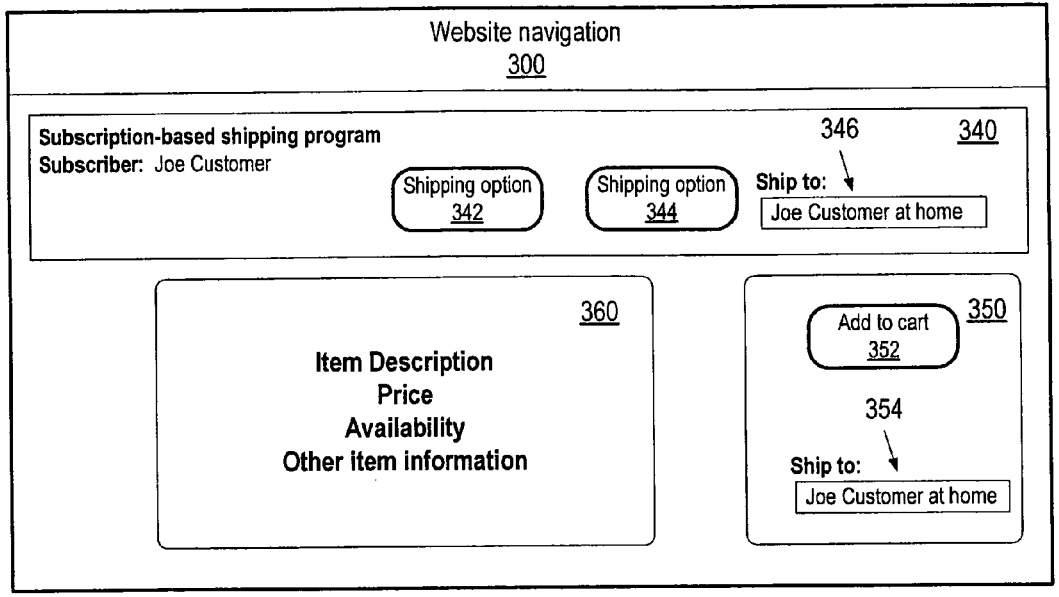
FIG. 16 illustrates an exemplary item detail Web page via which a primary or secondary subscriber may view information about an item and order the item according to one or more shipping options offered by the shipping program, if desired, according to one embodiment.

FIG. 16 illustrates an exemplary item detail Web page via which a primary or secondary subscriber may view information about an item and order (or pre-order, if the item is not yet available) the item according to one or more shipping options offered by the shipping program, if desired, according to one embodiment. Website navigation 300 may include one or more user interface elements, such as buttons, tabs menus, etc., through which the subscriber may navigate to other pages on the Web site and/or perform other functions, such as searches. Item detail area 360 may describe relevant graphical and/or textual information about the item associated with this item detail Web page, such as an item description, price, availability of the item, and other item information such as a picture of the item. User interface area 350 may include one or more user interface elements for selecting standard options of the e-commerce Web site, such as an "Add to cart" button 352 that allows the user to add the item shown on the Web page to a collection, or cart, of items that the user may purchase when done selecting items. Area 350 may also include a user interface element 354, such as a pop-up menu or text box, through which the user may select a shipping address for the item, if ordered. This item 354 may default to a default shipping address of the current user's account. Note that the information in areas 350 and 360 may be displayed for all customers of the Web site, and not just to subscribers to the shipping program.

A bar or stripe 340 may be displayed that may include one or more options available only to subscribers of the shipping program and specific to this item detail Web page. This bar 340 may only be displayed to subscribers; non-subscribers may see a similar item detail Web page without bar 340 or the options thereon. Bar 340 may display information about the subscriber, such as the subscriber's name. Bar 340 may also display one or more shipping option user interface elements for selecting from one or more shipping options available only to subscribers to the shipping program if the item associated with the item detail Web page is eligible for shipping options under the program. This example shows two shipping option user interface elements, buttons Shipping Option 342 and Shipping Option 344. For example, Shipping Option 342 may be "Free 2-day shipping" and Shipping Option 344 may be "Next-Day shipping for $4". Other shipping options may be provided. Note that embodiments may provide one, two, or more than two shipping options to subscribed customers. Also note that, in one embodiment, different shipping options may be available for different items on different item detail Web pages. Bar 340 may also include a user interface element 346, such as a pop-up menu or text box, through which the user may select a shipping address for the item, if ordered using one of the shipping options displayed in bar 340. This item 346 may default to the default shipping address of the subscription.

In one embodiment, the one or more shipping option user interface elements for selecting one of one or more shipping options offered under the shipping program may be single-action user interface elements. In this embodiment, if the subscriber selects one of the shipping option user interface elements in bar 340, the item associated with the item detail Web page may be automatically ordered for the subscriber according to the selecting shipping option of the shipping program and entered into the order system to be processed and shipped to the indicated shipping address without requiring any further action by the customer. In another embodiment, selecting one of the shipping option user interface elements in bar 340 may require the customer to perform further actions to order the associated item.

Alternatively, the subscriber may choose to add the item to the cart by selecting an "add to cart" user interface element (e.g., button 352) of area 350. In one embodiment, the "add to cart" user interface element may be a single-action user interface element with which the customer may order the item without requiring any further action by the customer. In one embodiment, the subscriber may, after completion of selecting items for the cart, go to another Web page for completing an order for all the items in the cart, at which the subscriber may be provided with the opportunity, through the user interface of the Web page, to specify or change shipping options under the shipping program for all selected items that are eligible under the program, and other shipping options for any selected items in the cart that are excluded from the shipping program.

Figure 17:
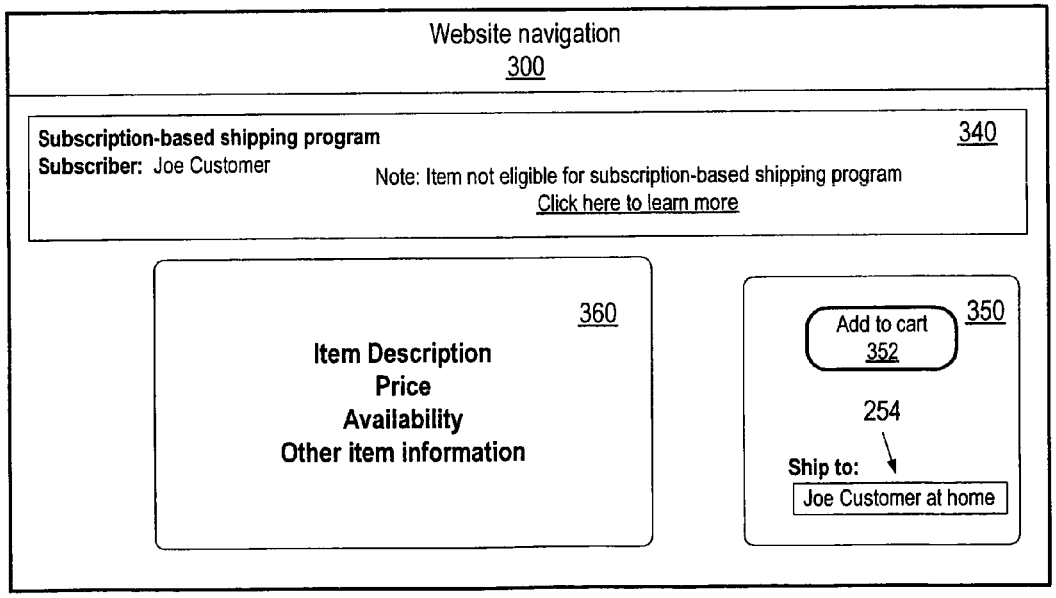
FIG. 17 illustrates an exemplary item detail Web page via which a primary or secondary subscriber may view information about an item and order the item if desired, according to one embodiment.

FIG. 17 illustrates an exemplary item detail Web page via which a primary or secondary subscriber may view information about an item and order the item if desired, according to one embodiment. In this exemplary item detail Web page, the item is excluded from the shipping program, and a message to that effect is displayed in bar 340. Bar 340 may also include information and/or a link to another page that describes in more detail why the item does not qualify for the shipping program. An item may be excluded from the shipping program for various reasons, for example due to the weight, size, and/or price of the item, because the item is ordered through or shipped by another vendor, because the item has special shipping requirements, etc. Note that other messages may be displayed in bar 340, such as messages indicating that the item associated with the page is out-of-print, out-of-stock or a discontinued item, a special order item, etc.

FIG. 18 illustrates an exemplary Web page via which a primary or secondary subscriber may view information about items that have been added to a cart or collection of items, for example using interface element 352 of the item detail Web pages of FIG. 16 or FIG. 17, which the customer may order, if desired, according to one embodiment. Website navigation 300 may include one or more user interface elements, such as buttons, tabs menus, etc., through which the subscriber may navigate to other pages on the Web site and/or perform other functions, such as searches. "Shipping to" area 370 may display the subscriber's name and the address the item(s) are to be shipped to, if ordered. A button or other interface element may allow the subscriber to change this displayed information, if desired. Order summary area 380 may display summary information for the items in the order as they are currently displayed on the page, such as total cost of the items, any relevant taxes, shipping charges, discounts, and other relevant information about the order. Payment method area 382 may display the current payment method to be used to bill the customer, e.g. a Visa or other credit card account. Area 382 may include a user interface element that allows the subscriber to change the payment method, if desired. Billing address area 384 may display the current billing address for the subscriber (or subscription); area 384 may include a user interface element that allows the subscriber to change the billing address, if desired.

Shipping options area 372 may display user interface elements that allow the subscriber to choose a shipping speed (e.g. Standard Shipping, Two-Day Shipping, or Next-Day Shipping), and user interface elements that allow the subscriber to choose a shipping preference (e.g. "Group my items in as few shipments as possible" or "Ship my items as they become available"). These items may default to selections specified by the shipping program. In this example, shipping speed is defaulted to Two-Day Shipping, and shipping preference is defaulted to "Ship my items as they become available". In other implementations, other options may be provided, and/or other options may be selected as the default options according to the shipping program.

Item area 374 may display all items currently in this order. Information about each item may be displayed, such as a brief item description and whether or not the item is eligible for the shipping options offered by the subscription-based shipping program. In this example, item A is not eligible under the shipping program, but items B and C are eligible. Item area 374 may also display information indicating how many shipments the items will be delivered in. In this example, the items will be shipped in two shipments, with item A in one shipment and items B and C (that are eligible under the shipping program) in another shipment. The subscriber may be given the option to specify the shipping speed and shipping method individually for each item or for all items collectively, possibly overriding the shipping options available under the shipping program for eligible items, or alternatively items that are eligible under the shipping program may automatically be shipped at the speed/method specified by the shipping program, and other items according to some other default or optional speed/method.

Exemplary System Architecture

Figure 19:
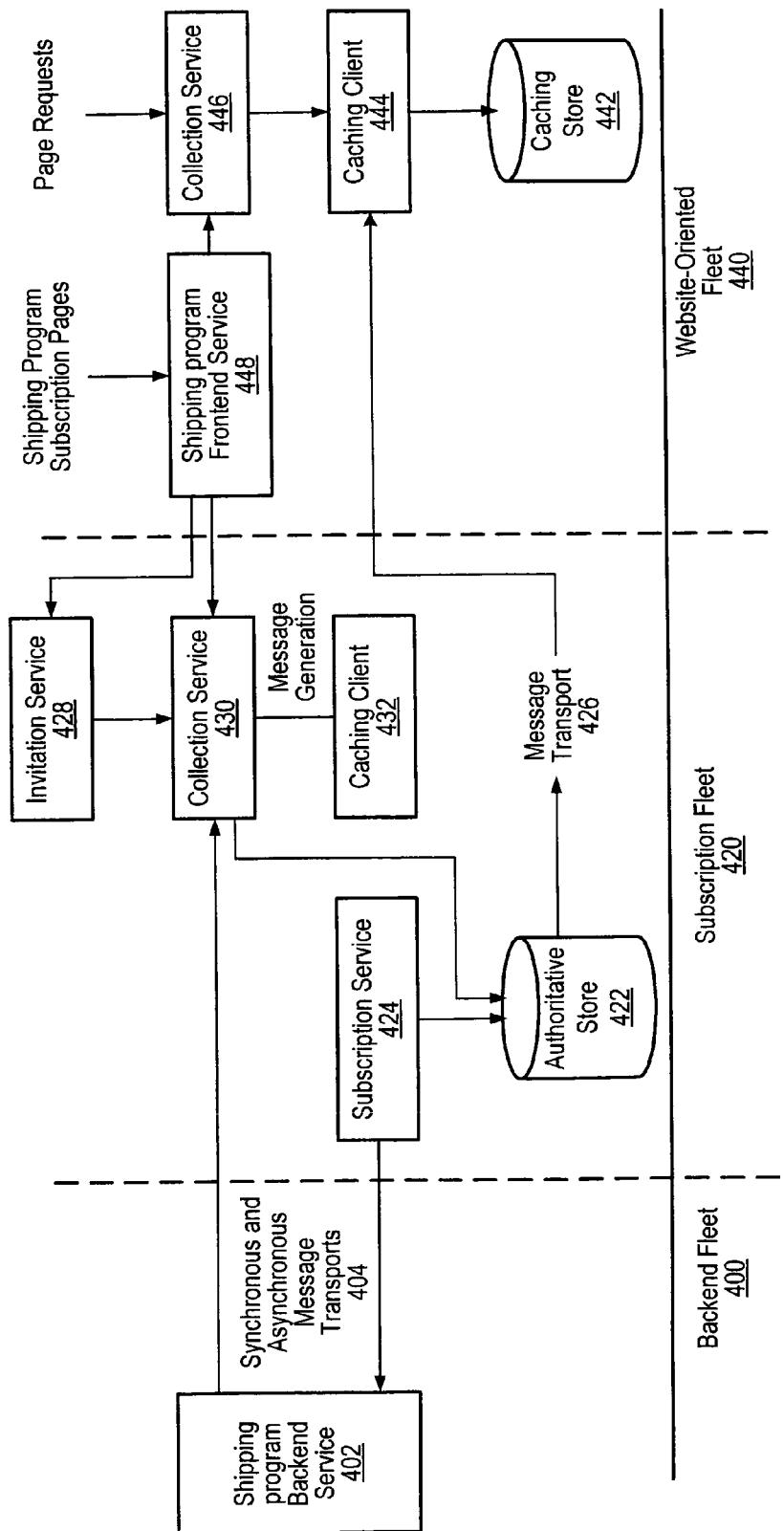
FIGS. 19 through 21 illustrate an exemplary architecture for implementing embodiments of a subscription-based shipping program on an e-commerce Web site of an electronic commerce enterprise according to one embodiment.
Figure 20:
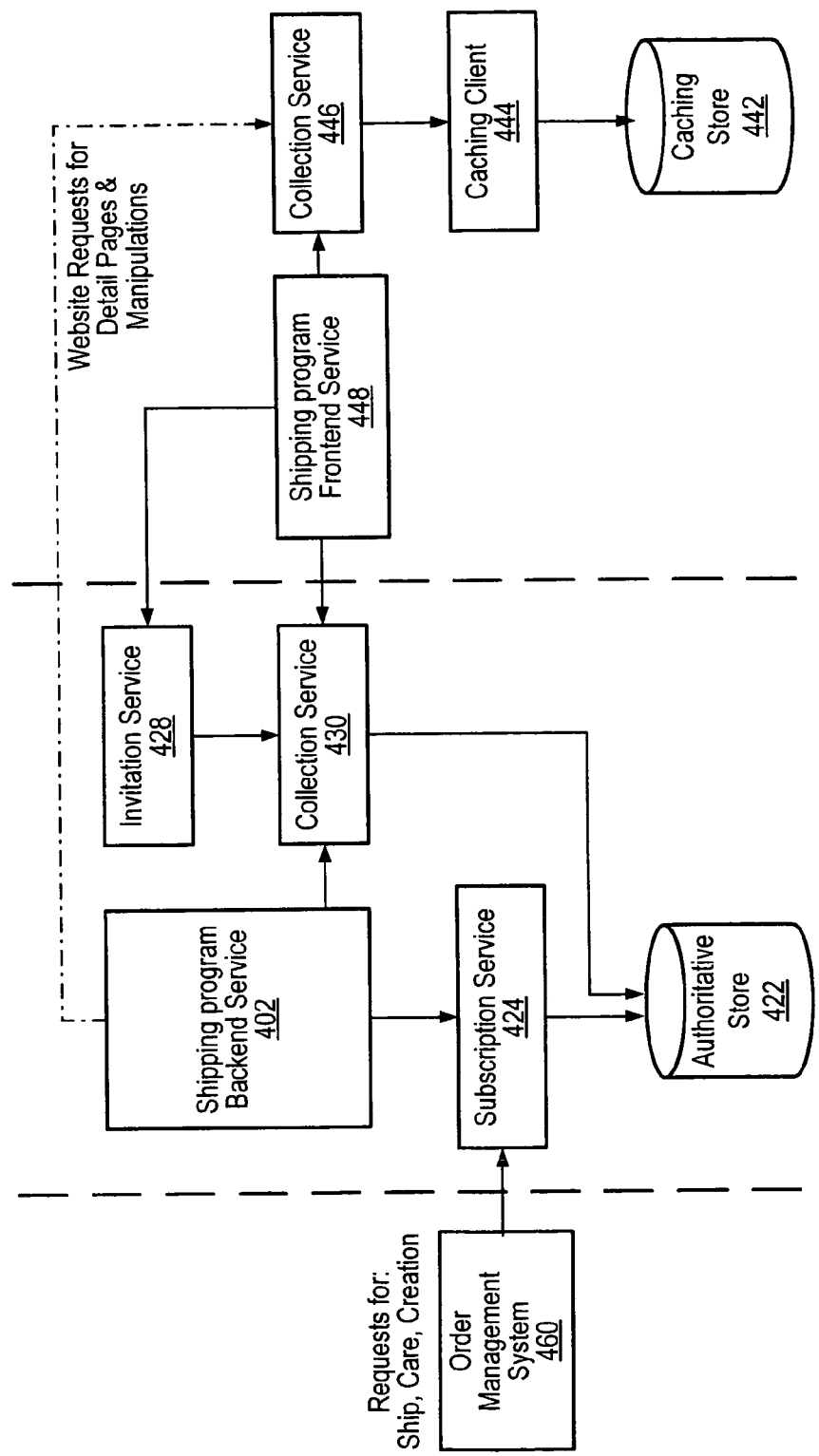
Figure 21:
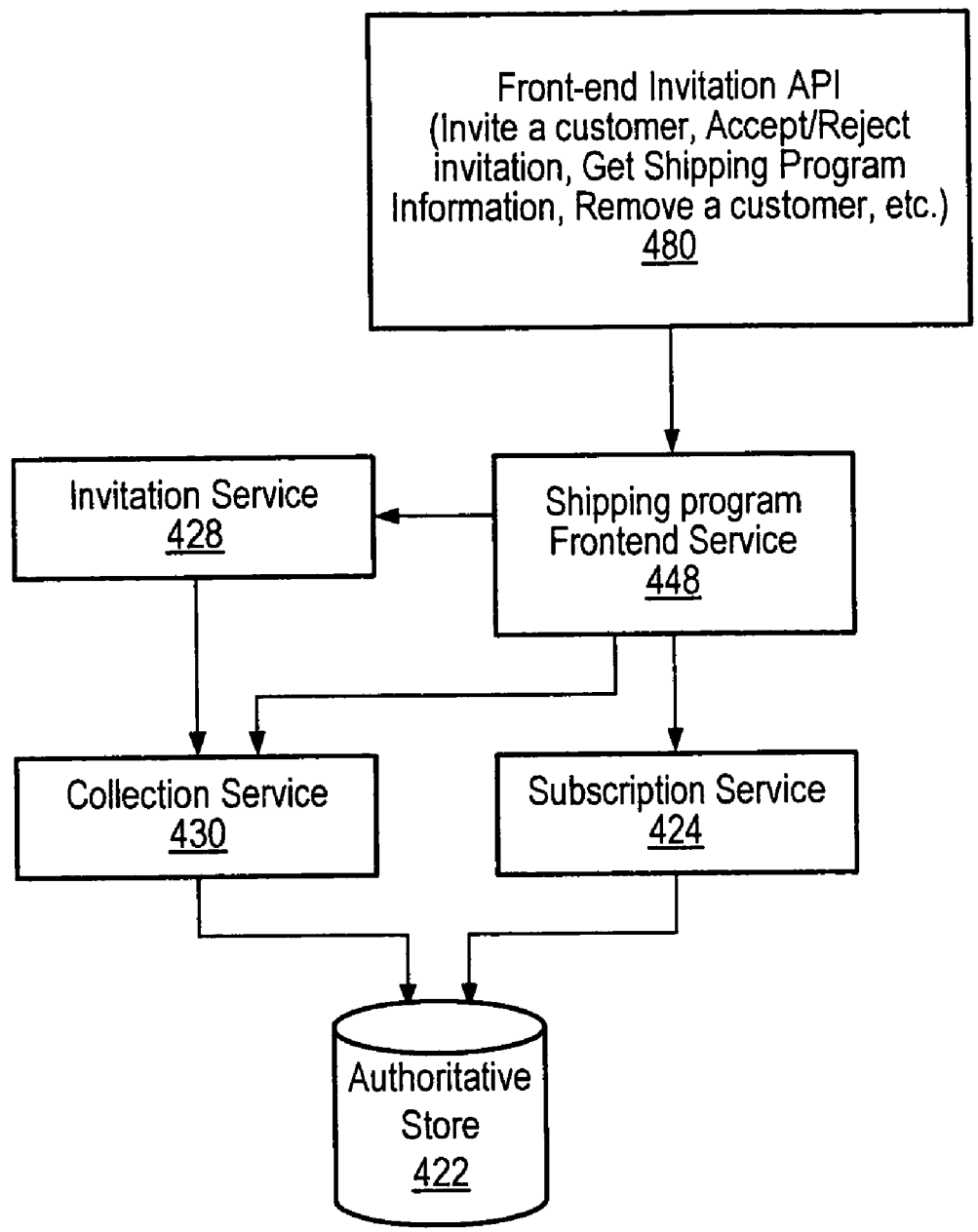

FIGS. 19 through 21 illustrate an exemplary architecture for implementing embodiments of a subscription-based shipping program on an e-commerce Web site of an electronic commerce enterprise as described herein. Note that any specific references to software or hardware products and methods, for example references to Oracle, are intended to be exemplary and not limiting. Embodiments may be implemented using other products and/or methods than those described.

FIG. 19 illustrates an exemplary implementation architecture for a system including a subscription-based shipping program on an e-commerce Web site of an electronic commerce enterprise as described herein. This exemplary implementation included three architectural fleets or components: a backend fleet 400, a subscription fleet 420, and a front-end fleet 440. A fleet, as used herein, is a collection of two or more systems, servers, machines, and/or other devices, such as system 900 illustrated in FIG. 22.

Embodiments may include implementation(s) of a collection service that provides underlying support for membership (subscription) sharing. A collection service may provide generic collections of entities associated with every subscription, for example a membership collection. A subscription may be associated with a membership collection that represents its membership. In one embodiment, members of the collection(s) may be the customer IDs of the customers that are participating in the subscription.

The collection service may model generic relationships among entities. Entities of a collection may all be related by some property. The property may be derived from the name of the collection and the type of the collection. The property may be application-specific; the collection service may not know about it. The collection service only knows that it has been given a name and type of collection that it captures. The collection service is given members of a collection, captures the identity of the members, and stores that basic relationship. All derived semantics occur at a higher layer, or application layer. One of these is for invitations (the invitation service). Invitation collections may represent the groups of people that have been invited to participate in subscriptions. The invitation service may be an application of the generic collection service.

Once a customer subscribes to the shipping program, the subscription is created and the collection is initialized with the customer. The primary subscriber (the owner of the subscription) is then able to invite other customers (e.g., members of the subscriber's household) to share the subscription. An additional collection, an "Invitees" collection that contains customers that have been invited to join the subscription, may be associated with the subscription. In addition, every customer may have a collection associated with their customer account that represents the subscriptions the customer has been invited to join. Note that the collections associated with customer accounts may be used to capture connections between customers: invitations to subscriptions, customers that participate together in subscriptions, etc. This information may be data-mined to look for connections between customers.

Embodiments may include a database instance that stores the membership information. This database instance may be an authoritative or primary store for data, including membership information, used by the Web site. In one embodiment, this database may be a transactional database. In one embodiment, this database may be a relational database, such as an Oracle database. A caching store may be used for general operations of the Web site. High-traffic pages of the Web site, such as item detail pages may hit the caching store. There may be a propagation delay in updating the caching store, so the caching store may not be 100% accurate, but may be sufficiently accurate for making decisions about which user interface elements are to be displayed on Web pages, etc. When customers need authoritative information because they are making decisions and/or spending money, for example when items selected by the customer are being ordered and are thus entering the order pipeline, the authoritative store, which may be a transactional database, may be hit instead of the caching store.

In one embodiment, caching client(s) may provide guaranteed data propagation. In one embodiment, the authoritative store may be transactionally accurate. For Website purposes, in some display-only use cases (not in order pipeline, for instance), for example on item detail pages, the caching store of the data, which may be slightly stale, may be accessed. The caching client(s) are the mechanism that propagates transactional data out to the caching store(s). Using caching clients, a server in a fleet may go down and, when brought back up, a replay of messages since the server went down may be performed to recover the caching store to a current state. If a server goes down, then when the server comes back up, the caching client provides the ability to replay the messages from the last message seen.

Backend fleet 400 may be running one or more instances of a shipping program backend service 402 that may handle both synchronous and asynchronous requests through asynchronous and synchronous message transports. In one embodiment, publish/subscribe and BSF/HTTP may be used as message transports. This service 402 may have two primary users:

- An order management system may communicate with backend service 402 to determine if an order is eligible for shipping under the subscription-based shipping program. The backend service 402 may consult the collection service 430 to see if the person who made the offer is a member of any shipping program subscription.
- The subscription service 424 may notify the backend service 402 when changes occur to a subscription. The backend service 402 may be responsible for interpreting the subscription changes and updating the metadata of an associated collection.

Subscription fleet 420 may include, but is not limited to, a subscription deployment along with an invitation service 428 and a collection service 430. The latter two components may be unique in that none of the other subscription components may communicate directly to them. Rather, these two components may be general components available to users of the subscription feature to associate other customers with a subscription and to invite them to join a subscription. The invitation service 428 may receive requests to invite customers to become associated with a subscription. This association may be tracked using a collection. The collection service 430 may be used by users of the subscription component to create collections of members to associate with a subscription.

In website oriented fleet 440, each machine may include, but is not limited to, instances of the following services:

- A cache-only (read-only) collection service 446 used by Web pages, for example item detail pages, in order to determine whether subscription-based shipping program user interface elements should be displayed on the page. The Web page may ask for all collections for a member looking at the page to determine if any of those collections are subscription-associated collections and if they are active. In one embodiment, this may be performed using a combination of the collection type and metadata.
- The shipping program front-end service 448 may be used by subscription-based shipping program-specific web pages.

Collections with the Subscription-Based Shipping Program—Overall Architecture

In implementations, there may be different configurations of the collection service, which may include, but are not limited to:

- A single collection service 430 may be deployed with two underlying data sources—a JDBC (or other type of) data source and a "propagate only" caching client 432 data source. The data source may be the authoritative store 422 instance used by the subscription service 424. Changes made to this underlying data source may be made in conjunction with table inserts to ensure eventual consistency between the authoritative data source (authoritative store 422) and caches (caching client 432). This collection service 430 may be contacted by back-end service 402 and the invitation service 428.
- The collection service 446 may be deployed to n-machines with only the caching client 444 as a data source for collection information. These instances of the collection service 446 may be used by the item detail pages or any other Web page that needs to answer the question "Is the customer a member of a subscription to the shipping program?" The caching client 444 collection data source may receive propagation messages from the first configuration and may support read only access.

Invitations Component

FIG. 20 illustrates an exemplary implementation architecture for the "invitations" component of a subscription-based shipping program on an e-commerce Web site of an electronic commerce enterprise as described herein. Exemplary details of the user experience for signing up another member to be associated with a shipping program subscription, as well as exemplary implementation architecture for the invitations component, are described.

After a customer subscribes to the shipping program (as the primary subscriber), the subscriber may be directed to a shipping program subscription main detail page, such as the Web page illustrated in FIG. 13, which may display one or more of, but not limited to, the following:

- When the customer signed up for the shipping program
- Information about the shipping program in general (benefits, terms, fees, restrictions, etc)
- When the subscription expires
- Information about extending the length of the subscription, either manually or by setting up an automatic process
- A list of customer accounts that the subscriber has associated with this subscription (secondary subscribers)—the person who originally signed up for the program (the primary subscriber) may always be listed
- A list of e-mail addresses (and possibly other information) of customers that have been invited to share the subscription, along with when they were invited.

In one embodiment, each customer account already associated with the shipping program subscription and thus displayed in the list of customer accounts may have a 'remove' button or other user interface element next to the customer information. An 'invite family member' button or other user interface element may be displayed, along with information about restrictions related to who a customer may invite to share the subscription.

In one embodiment, selecting the 'remove' button may take the primary subscriber to a confirmation page with 'ok' or 'cancel' options. The subscriber may be told that the customer being removed will be notified via e-mail.

In one embodiment, an 'add' button on the shipping program subscription main detail page may take the user to a Web page, such as the Web page illustrated in FIG. 13, including a user interface element for entering an e-mail address, and possibly user interface elements for entering other information about a customer to be invited, along with text which says something like "When the person responds to this e-mail they must provide the last four digits of the credit card (or, alternatively, other information such as birth dates) used to purchase this program. Please ensure that they have this information so that we can authenticate them and associate them with this program." The primary subscriber may enter the requested information for the person to be invited, and then click "send". A page may then be displayed saying something like "the invitation is being e-mailed to the e-mail account 'xxx'. Please insure that the recipient has the last four digits of the credit card used to purchase this program (or, alternatively, other information such as birth dates) for authentication purposes".

In one embodiment, a customer who is invited to join the subscription may receive an e-mail containing a URL that may be accessed to confirm that they want to join the subscription. This URL may take them to a sign-in page for the e-commerce Web site. In one embodiment, if the customer does not have a user account with the Web site, they may be able to sign up for an account through a link on this page. After signing in, the invited customer may be directed to a Web page to confirm whether they want to accept the invitation and join the subscription. An exemplary Web page for accepting invitations is illustrated in FIG. 15. This page may include one or more user interface elements for the invited customer to enter in the last four digits of the primary subscriber's credit card, or alternatively other information such as the birth dates of the primary subscriber and the invited customer, to authenticate the customer. Information about the shipping program/subscription (e.g., stating that it is free, and describing the benefits) along with "accept" and "reject" buttons may be displayed. If the customer selects "accept" and they have entered the correct authentication information, then they may be directed to a shipping program subscription main detail page, such as the exemplary page illustrated in FIG. 13, for the subscription with which they are now associated (i.e. to which they are a secondary subscriber). Errors by the customer may loop back to the confirmation page with an error detail message.

One embodiment may use a mechanism to verify or authenticate that invited customers are members of the household (or other entity) of the primary subscriber to the shipping program that may require those invited to join the subscription to provide specific personal information associated with the subscription/primary subscriber, such as:

The e-mail address of the person that is initially associated with the program (the primary subscriber)

The last four digits of the credit card used to pay for the program

The zip code of the primary residence of the person that is initially associated with the program (the primary subscriber)

The birth dates of the primary subscriber and of the invited customer

Various embodiments may use one or more of these information items for verification/authentication, and/or other information may be used.

In one embodiment, a customer may not be prevented from being a subscriber to two or more subscriptions to the shipping program. If a customer is subscribed to two or more subscriptions, one of the subscriptions may be selected by the system when necessary. In one embodiment, a subscription may be randomly but deterministically selected. In another embodiment, customers may be prevented from subscribing to multiple subscriptions.

In one embodiment, only one subscriber to a subscription may be the primary subscriber. In another embodiment, more than one subscriber to a particular subscription may be designated as a "primary subscriber", and may thus perform actions described herein for primary subscribers, such as inviting other customers to share the subscription and deleting secondary subscribers. In this embodiment, a mechanism may be provided to designate one or more secondary subscribers that have accepted invitations to share the subscription to become "primary subscribers." In one embodiment, the primary subscriber may transfer the "primary subscribership" to another subscriber. In another embodiment, the primary subscriber may not be allowed to transfer the primary subscribership. In one embodiment, the primary subscriber may be unable to remove themselves from the collection of subscribers associated with a subscription. In another embodiment, a primary subscriber may be allowed to remove themselves from the collection of subscribers associated with a subscription.

Exemplary Implementation Architecture for the Invitations Component

In one embodiment, the invitation component is a general component responsible for tracking a set of invitations extended on behalf of an entity, the invitations that have been extended to an entity, and acceptance and rejection of invitations. Acceptance of an invitation may automatically manipulate a collection that is related to the invitation.

In one embodiment, the invitation implementation may not manage or retain ownership of the collection that the invitations are being applied towards. Reasons for separating out the invitation from the membership management may include, but are not limited to:

Invitations may not need to manipulate a collection when an invitation is accepted. By separating this out, refactoring may be possible to use this component to do invitations that have results other than adding to a collection.

Group membership and manipulation may be exposed using the collection service. Anything other than this basic API may require application-specific logic that may not be embedded within the invitation component.

While deploying and maintaining one service may be easier than two, there may be cases where collections are used that invitations are not used and, possibly, vice versa.

The expected load placed on these services may be different—the collections may be hit O(orders) (i.e., for each order) while the invitations may be hit O(customers in program) (i.e., each time a customer is invited to join as a subscriber)

Shipping Program Front-End Service—Exemplary Overall Architecture

FIG. 21 illustrates an exemplary implementation architecture for the shipping program front-end service 448 component of a subscription-based shipping program on an e-commerce Web site of an electronic commerce enterprise as described herein. Front-end invitation API 480 may provide interfaces to various functionalities of the shipping program front-end service 448. Front-end invitation API 480 may, for example, provide interfaces to invite a customer, accept/reject invitations, get shipping program information, remove a customer, etc. Shipping program front-end service 448 may access the invitation service 428, collection service 430, and subscription service 424. Subscription service 424 and collection service 430 may access the authoritative store 422.

Exemplary System

In one embodiment, an e-commerce Web site of an electronic commerce enterprise that implements a subscription-based shipping program as described herein in FIGS. 3 through 21 may include a general-purpose computer system that includes or is configured to access one or more computer-accessible media, such as computer system 900 illustrated in FIG. 22. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an e-commerce Web site of an electronic commerce enterprise that implements a subscription-based shipping program, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900, other computer systems (if any) that are part of the e-commerce enterprise, other servers on the Internet, and computers used by customers of the e-commerce Web site elsewhere on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   for a plurality of users accessing an e-commerce site implemented on one or more computer devices, determining whether each user is a subscriber to a subscription-based shipping program that provides two or more subscriber shipping options for at least some items offered on the e-commerce site for the duration of a subscription, wherein the two or more subscriber shipping options do not depend on a quantity of an item ordered;
   in response to determining that one of the users is a subscriber to the subscription-based shipping program, generating an item selection user interface for the subscribed user comprising two or more shipping program user interface elements providing the subscribed user the ability to select among the two or more subscriber shipping options for the at least some items offered on the e-commerce site; and in response to determining that a different one of the users is not a subscriber to the subscription-based shipping program, generating an item selection user interface for the non-subscribed user that does not include the two or more shipping program user interface elements, wherein in response to determining that a different one of the users is not a subscriber to the subscription-based shipping program, the user interface for the non-subscribed user provides the non-subscribed user the ability to select among one or more non-subscriber shipping options for the at least some items offered on the e-commerce site, and does not provide the non-subscribed user the ability to select among the two or more subscriber shipping options for the at least some items.

2. The computer-implemented method as recited in claim 1, wherein the two or more shipping program user interface elements are single-action user interface elements, the method further comprising:
  receiving input from the subscribed user selecting one of the two or more shipping program single-action user interface elements for at least one of the at least some items; and
  automatically generating an order for the at least one item in response to said receiving input from the subscribed user selecting one of the two or more shipping program single-action user interface elements, and wherein no additional input from the user is required to generate the order.

3. The computer-implemented method as recited in claim 1, wherein the two or more subscriber shipping options include at least one shipping option for which subscribed users are not charged for shipping for said at least some items.

4. The computer-implemented method as recited in claim 1, wherein the two or more subscriber shipping options include at least one shipping option for which subscribed users are charged at a lower rate for shipping than non-subscribed users for said at least some items.

5. The computer-implemented method as recited in claim 1, wherein the two or more subscriber shipping options include at least one shipping option for which subscribed users are not charged for shipping for said at least some items and at least one shipping option for which subscribed users are charged at a lower rate for shipping than non-subscribed users for said at least some items.

6. The computer-implemented method as recited in claim 1, wherein the subscription-based shipping program includes two or more levels of subscription, wherein subscribed users at different levels are provided with different features for different subscription fees at the two or more levels of subscription.

7. The computer-implemented method as recited in claim 6, wherein the features include at least one of: expedited handling, the ability to return the purchased item at no charge, free gift wrapping, free engraving, or access to a digital copy of the item.

8. The computer-implemented method as recited in claim 1, further comprising providing subscribed users of the shipping program exclusive access to one or more services of the e-commerce site not offered to non-subscribed users of the e-commerce site.

9. The computer-implemented method as recited in claim 8, wherein the one or more services include at least one of: expedited handling, the ability to return the purchased item at no charge, free gift wrapping, free engraving, or access to a digital copy of the item.

10. The computer-implemented method as recited in claim 1, wherein said at least some items offered on the e-commerce site are offered to users subscribed to the shipping program at the same price offered to non-subscribed users.

11. The computer-implemented method as recited in claim 1, wherein shipping charges to the subscribed user for items shipped according to one of the two or more subscriber shipping options are lower than shipping charges for respective shipping options having the same delivery terms provided to non-subscribed users.

12. The computer-implemented method as recited in claim 1, further comprising:
  displaying one or more subscription sharing user interface elements to the subscribed user, wherein the subscription sharing user interface elements are configured for receiving input to share existing subscriptions to the shipping program with other users of the e-commerce site; and
  receiving input from the subscribed user accessing the one or more subscription sharing user interface elements to share the subscription to the shipping program with a user of the e-commerce site specified by the subscribed user, wherein each user that shares the subscription has a separate account via which the user accesses the e-commerce site.

13. The computer-implemented method as recited in claim 12, wherein the subscription sharing is limited to a defined community to which the subscribed user belongs.

14. The computer-implemented method as recited in claim 13, wherein the defined community is one of: the subscribed user's household, a business, a residence complex, or a school.

15. The computer-implemented method as recited in claim 1, further comprising:
  displaying one or more subscription invitation user interface elements to the subscribed user, wherein the subscription invitation user interface elements are configured for receiving input to generate invitations to share existing subscriptions to the shipping program with other users of the e-commerce site;
  receiving input from the subscribed user accessing the one or more subscription invitation user interface elements to invite a user of the e-commerce site specified by the subscribed user to share the subscription to the shipping program; and
  in response to said input from the subscribed user accessing the one or more subscription invitation user interface elements, sending an invitation to the invited user to share the subscription to the shipping program.

16. The computer-implemented method as recited in claim 15, further comprising subscribing the invited user to the subscription-based shipping program in response to receiving input from the invited user to accept the invitation to share the subscription, wherein each user that shares the subscription has a separate account via which the user accesses the e-commerce site.

17. The computer-implemented method as recited in claim 1, further comprising charging a subscription fee to the user upon subscribing the user to the shipping program.

18. The computer-implemented method as recited in claim 1, further comprising subscribing a user to the subscription-based shipping program in response to the user accessing one or more subscription user interface elements of the e-commerce site.

19. The computer-implemented method as recited in claim 1, further comprising subscribing a user to the subscription-based shipping program automatically in response to the user selecting a single-action user interface element of the e-commerce site for subscribing to the subscription-based shipping program.

20. The computer-implemented method as recited in claim 1, further comprising subscribing a user to the subscription-based shipping program in response to receiving a subscription request specifying the user via a web services interface of the e-commerce site.

21. The computer-implemented method as recited in claim 1, further comprising subscribing a user to the subscription-based shipping program in response to receiving a response to an invitation to share a subscription to the shipping program sent to the user by the e-commerce site.

22. The computer-implemented method as recited in claim 1, further comprising:
receiving over a network on a web services interface of the e-commerce site a message requesting an order of one of the at least some items for a subscribed user;
generating an order for the requested item to be shipped by one of the two or more subscriber shipping options.

23. The computer-implemented method as recited in claim 1, further comprising directing each item ordered by the subscribed user according to one of the two or more subscriber shipping options to be shipped as soon as the respective item is available to be shipped.

24. The computer-implemented method as recited in claim 1, further comprising directing two or more items separately ordered by the subscribed user according to one of the two or more subscriber shipping options to be consolidated and shipped in one shipment.

25. The computer-implemented method as recited in claim 1, further comprising directing items ordered by the subscribed user according to one of the two or more subscriber shipping options to be shipped on scheduled shipping dates at periodic or aperiodic intervals.

26. A computer-accessible storage medium comprising program instructions, wherein the program instructions are computer-executable to implement:
for a plurality of users accessing an e-commerce site, determining whether each user is a subscriber to a subscription-based shipping program that provides two or more subscriber shipping options for at least some items offered on the e-commerce site for the duration of a subscription, wherein the two or more subscriber shipping options do not depend on a quantity of an item ordered;
in response to determining that one of the users is a subscriber to the subscription-based shipping program, generating an item selection user interface for the subscribed user comprising two or more shipping program user interface elements providing the subscribed user the ability to select among the two or more subscriber shipping options for the at least some items offered on the e-commerce site; and
in response to determining that a different one of the users is not a subscriber to the subscription-based shipping program, generating an item selection user interface for the non-subscribed user that does not include the two or more shipping program user interface elements, wherein in response to determining that a different one of the users is not a subscriber to the subscription-based shipping program, the user interface for the non-subscribed user provides the non-subscribed user the ability to select among one or more non-subscriber shipping options for the at least some items offered on the e-commerce site, and does not provide the non-subscribed user the ability to select among the two or more subscriber shipping options for the at least some items.

27. The computer-accessible storage medium as recited in claim 26, wherein the two or more shipping program user interface elements are single-action user interface elements, wherein the program instructions are computer-executable to further implement:
receiving input from the subscribed user selecting one of the two or more shipping program single-action user interface elements for at least one of the at least some items; and
automatically generating an order for the at least one item in response to said receiving input from the subscribed user selecting one of the two or more shipping program single-action user interface elements, and wherein no additional input from the user is required to generate the order.

28. The computer-accessible storage medium as recited in claim 26, wherein the two or more subscriber shipping options include at least one shipping option for which subscribed users are not charged for shipping for said at least some items.

29. The computer-accessible storage medium as recited in claim 26, wherein the two or more subscriber shipping options include at least one shipping option for which subscribed users are charged at a lower rate for shipping than non-subscribed users for said at least some items.

30. The computer-accessible storage medium as recited in claim 26, wherein the two or more subscriber shipping options include at least one shipping option for which subscribed users are not charged for shipping for said at least some items and at least one shipping option for which subscribed users are charged at a lower rate for shipping than non-subscribed users for said at least some items.

31. The computer-accessible storage medium as recited in claim 26, wherein the subscription-based shipping program includes two or more levels of subscription, wherein subscribed users at different levels are provided with different features for different subscription fees at the two or more levels of subscription.

32. The computer-accessible storage medium as recited in claim 31, wherein the features include at least one of: expedited handling, the ability to return the purchased item at no charge, free gift wrapping, free engraving, or access to a digital copy of the item.

33. The computer-accessible storage medium as recited in claim 26, wherein the program instructions are computer-executable to further implement providing subscribed users of the shipping program exclusive access to one or more services of the e-commerce site not offered to non-subscribed users of the e-commerce site.

34. The computer-accessible storage medium as recited in claim 33, wherein the one or more services include at least one of: expedited handling, the ability to return the purchased item at no charge, free gift wrapping, free engraving, or access to a digital copy of the item.

35. The computer-accessible storage medium as recited in claim 26, wherein said at least some items offered on the e-commerce site are offered to users subscribed to the shipping program at the same price offered to non-subscribed users.

36. The computer-accessible storage medium as recited in claim 26, wherein shipping charges to the subscribed user for items shipped according to one of the two or more subscriber shipping options are lower than shipping charges for respective shipping options having the same delivery terms provided to non-subscribed users.

37. The computer-accessible storage medium as recited in claim 26, wherein the program instructions are computer-executable to further implement:
- displaying one or more subscription sharing user interface elements to the subscribed user, wherein the subscription sharing user interface elements are configured for receiving input to share existing subscriptions to the shipping program with other users of the e-commerce site; and
- receiving input from the subscribed user accessing the one or more subscription sharing user interface elements to share the subscription to the shipping program with a user of the e-commerce site specified by the subscribed user, wherein each user that shares the subscription has a separate account via which the user accesses the e-commerce site.

38. The computer-accessible storage medium as recited in claim 37, wherein the subscription sharing is limited to a defined community to which the subscribed user belongs.

39. The computer-accessible storage medium as recited in claim 38, wherein the defined community is one of: the subscribed user's household, a business, a residence complex, or a school.

40. The computer-accessible storage medium as recited in claim 26, wherein the program instructions are computer-executable to further implement:
- displaying one or more subscription invitation user interface elements to the subscribed user, wherein the subscription invitation user interface elements are configured for receiving input to generate invitations to share existing subscriptions to the shipping program with other users of the e-commerce site;
- receiving input from the subscribed user accessing the one or more subscription invitation user interface elements to invite a user of the e-commerce site specified by the subscribed user to share the subscription to the shipping program; and
- in response to said input from the subscribed user accessing the one or more subscription invitation user interface elements, sending an invitation to the invited user to share the subscription to the shipping program.

41. The computer-accessible storage medium as recited in claim 40, wherein the program instructions are computer-executable to further implement subscribing the invited user to the subscription-based shipping program in response to receiving input from the invited user to accept the invitation to share the subscription, wherein each user that shares the subscription has a separate account via which the user accesses the e-commerce site.

42. The computer-accessible storage medium as recited in claim 26, wherein the program instructions are computer-executable to further implement charging a subscription fee to the user upon subscribing the user to the shipping program.

43. The computer-accessible storage medium as recited in claim 26, wherein the program instructions are computer-executable to further implement subscribing a user to the subscription-based shipping program in response to the user accessing one or more subscription user interface elements of the e-commerce site.

44. The computer-accessible storage medium as recited in claim 26, wherein the program instructions are computer-executable to further implement subscribing a user to the subscription-based shipping program automatically in response to the user selecting a single-action user interface element of the e-commerce site for subscribing to the subscription-based shipping program.

45. The computer-accessible storage medium as recited in claim 26, wherein the program instructions are computer-executable to further implement subscribing a user to the subscription-based shipping program in response to receiving a subscription request specifying the user via a web services interface of the e-commerce site.

46. The computer-accessible storage medium as recited in claim 26, wherein the program instructions are computer-executable to further implement subscribing a user to the subscription-based shipping program in response to receiving a response to an invitation to share a subscription to the shipping program sent to the user by the e-commerce site.

47. The computer-accessible storage medium as recited in claim 26, wherein the program instructions are computer-executable to further implement:
- receiving over a network on a web services interface of the e-commerce site a message requesting an order of one of the at least some items for a subscribed user;
- generating an order for the requested item to be shipped by one of the two or more subscriber shipping options.

48. The computer-accessible storage medium as recited in claim 26, wherein the program instructions are computer-executable to further implement directing each item ordered by the subscribed user according to one of the two or more subscriber shipping options to be shipped as soon as the respective item is available to be shipped.

49. The computer-accessible storage medium as recited in claim 26, wherein the program instructions are computer-executable to further implement directing two or more items separately ordered by the subscribed user according to one of the two or more subscriber shipping options to be consolidated and shipped in one shipment.

50. The computer-accessible storage medium as recited in claim 26, wherein the program instructions are computer-executable to further implement directing items ordered by the subscribed user according to one of the two or more subscriber shipping options to be shipped on scheduled shipping dates at periodic or aperiodic intervals.

51. A system, comprising:
- one or more data storage devices configured to store data for an enterprise; and
- one or more servers configured to implement enterprise logic configured to:
  - for a plurality of users, determine whether each user is a subscriber to a subscription-based shipping program that provides two or more subscriber shipping options for at least some items offered by the enterprise for the duration of a subscription, wherein the two or more subscriber shipping options do not depend on a quantity of an item ordered;
  - in response to determining that one of the users is a subscriber to the subscription-based shipping program, generate an item selection user interface for the subscribed user comprising two or more shipping program user interface elements providing the subscribed user the ability to select among the two or more subscriber shipping options for the at least some items offered by the enterprise; and
  - in response to determining that a different one of the users is not a subscriber to the subscription-based shipping program, generate an item selection user interface for the non-subscribed user that does not include the two or more shipping program user interface elements, wherein in response to determining that a different one of the users is not a subscriber to the subscription-based shipping program, the user interface for the non-subscribed user provides the non-subscribed user the ability to select among one or more non-subscriber shipping options for the at least some items offered on the e-commerce site, and does not provide the non-subscribed user the ability to select among the two or more subscriber shipping options for the at least some items.

52. The system as recited in claim 51, wherein the two or more shipping program user interface elements are single-action user interface elements, wherein the enterprise logic is further configured to:
receive input from the subscribed user selecting one of the two or more shipping program single-action user interface elements for at least one of the at least some items; and
automatically generate an order for the at least one item in response to receiving the input from the subscribed user selecting one of the two or more shipping program single-action user interface elements, and wherein no additional input from the user is required to generate the order.

53. The system as recited in claim 51, wherein the two or more subscriber shipping options include at least one shipping option for which subscribed users are not charged for shipping for said at least some items.

54. The system as recited in claim 51, wherein the two or more subscriber shipping options include at least one shipping option for which subscribed users are charged at a lower rate for shipping than non-subscribed users for said at least some items.

55. The system as recited in claim 51, wherein the two or more subscriber shipping options include at least one shipping option for which subscribed users are not charged for shipping for said at least some items and at least one shipping option for which subscribed users are charged at a lower rate for shipping than non-subscribed users for said at least some items.

56. The system as recited in claim 51, wherein the subscription-based shipping program includes two or more levels of subscription, wherein subscribed users at different levels are provided with different features for different subscription fees at the two or more levels of subscription.

57. The system as recited in claim 56, wherein the features include at least one of: expedited handling, the ability to return the purchased item at no charge, free gift wrapping, free engraving, or access to a digital copy of the item.

58. The system as recited in claim 51, wherein the enterprise logic is further configured to provide subscribed users of the shipping program exclusive access to one or more services not offered to non-subscribed users.

59. The system as recited in claim 58, wherein the one or more services include at least one of: expedited handling, the ability to return the purchased item at no charge, free gift wrapping, free engraving, or access to a digital copy of the item.

60. The system as recited in claim 51, wherein said at least some items offered by the enterprise are offered to users subscribed to the shipping program at the same price offered to non-subscribed users.

61. The system as recited in claim 51, wherein shipping charges to the subscribed user for items shipped according to one of the two or more subscriber shipping options are lower than shipping charges for respective shipping options having the same delivery terms provided to non-subscribed users.

62. The system as recited in claim 51, wherein the enterprise logic is further configured to:
display one or more subscription sharing user interface elements to the subscribed user, wherein the subscription sharing user interface elements are configured for receiving input to share existing subscriptions to the shipping program with other users; and
receive input from the subscribed user accessing the one or more subscription sharing user interface elements to share the subscription to the shipping program with a user specified by the subscribed user, wherein each user that shares the subscription has a separate account via which the user accesses the e-commerce site.

63. The system as recited in claim 61, wherein the subscription sharing is limited to a defined community to which the subscribed user belongs.

64. The system as recited in claim 63, wherein the defined community is one of: the subscribed user's household, a business, a residence complex, or a school.

65. The system as recited in claim 51, wherein the enterprise logic is further configured to:
display one or more subscription invitation user interface elements to the subscribed user, wherein the subscription invitation user interface elements are configured for receiving input to generate invitations to share existing subscriptions to the shipping program with other users;
receive input from the subscribed user accessing the one or more subscription invitation user interface elements to invite a user specified by the subscribed user to share the subscription to the shipping program; and
in response to said input from the subscribed user accessing the one or more subscription invitation user interface elements, send an invitation to the invited user to share the subscription to the shipping program.

66. The system as recited in claim 65, wherein the enterprise logic is further configured to subscribe the invited user to the subscription-based shipping program in response to receiving input from the invited user to accept the invitation to share the subscription, wherein each user that shares the subscription has a separate account via which the user accesses the e-commerce site.

67. The system as recited in claim 51, wherein the enterprise logic is further configured to charge a subscription fee to the user upon subscribing the user to the shipping program.

68. The system as recited in claim 51, wherein the enterprise logic is further configured to subscribe a user to the subscription-based shipping program in response to the user accessing one or more subscription user interface elements.

69. The system as recited in claim 51, wherein the enterprise logic is further configured to subscribe a user to the subscription-based shipping program automatically in response to the user selecting a single-action user interface element for subscribing to the subscription-based shipping program.

70. The system as recited in claim 51, wherein the enterprise logic is further configured to subscribe a user to the subscription-based shipping program in response to receiving a subscription request specifying the user via a web services interface of the enterprise.

71. The system as recited in claim 51, wherein the enterprise logic is further configured to subscribe a user to the subscription-based shipping program in response to receiving a response to an invitation to share a subscription to the shipping program sent to the user.

72. The system as recited in claim 51, wherein the enterprise logic is further configured to:
receive over a network on a web services interface of the enterprise a message requesting an order of one of the at least some items for a subscribed user;
generate an order for the requested item to be shipped by one of the two or more subscriber shipping options.

73. The system as recited in claim 51, wherein the enterprise logic is further configured to direct each item ordered by the subscribed user according to one of the two or more subscriber shipping options to be shipped as soon as the respective item is available to be shipped.

74. The system as recited in claim 51, wherein the enterprise logic is further configured to direct two or more items separately ordered by the subscribed user according to one of the two or more subscriber shipping options to be consolidated and shipped in one shipment.

75. The system as recited in claim 51, wherein the enterprise logic is further configured to direct items ordered by the subscribed user according to one of the two or more subscriber shipping options to be shipped on scheduled shipping dates at periodic or aperiodic intervals.

* * * * *

UNITED STATES PATENT AND TRADEMARK OFFICE
CERTIFICATE OF CORRECTION

PATENT NO. : 7,590,563 B1 Page 1 of 1
APPLICATION NO. : 11/170804
DATED : September 15, 2009
INVENTOR(S) : Ward et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-first Day of September, 2010

David J. Kappos
*Director of the United States Patent and Trademark Office*